United States Patent
Sakumoto et al.

(10) Patent No.: US 9,129,122 B2
(45) Date of Patent: Sep. 8, 2015

(54) SIGNATURE VERIFICATION APPARATUS, SIGNATURE VERIFICATION METHOD, PROGRAM, AND RECORDING MEDIUM

(76) Inventors: Koichi Sakumoto, Tokyo (JP); Taizo Shirai, Kanagawa (JP); Harunaga Hiwatari, Kanagawa (JP)

(*) Notice: Subject to any disclaimer, the term of this patent is extended or adjusted under 35 U.S.C. 154(b) by 0 days.

(21) Appl. No.: 14/239,926

(22) PCT Filed: Jul. 19, 2012

(86) PCT No.: PCT/JP2012/068324
§ 371 (c)(1),
(2), (4) Date: Feb. 20, 2014

(87) PCT Pub. No.: WO2013/031414
PCT Pub. Date: Mar. 7, 2013

(65) Prior Publication Data
US 2014/0223193 A1  Aug. 7, 2014

(30) Foreign Application Priority Data
Aug. 29, 2011  (JP) ................................ 2011-185946

(51) Int. Cl.
*G06F 21/64* (2013.01)
*G06F 21/60* (2013.01)
*H04L 9/32* (2006.01)
*H04L 9/30* (2006.01)

(52) U.S. Cl.
CPC ............ *G06F 21/602* (2013.01); *H04L 9/3093* (2013.01); *H04L 9/3252* (2013.01)

(58) Field of Classification Search
None
See application file for complete search history.

(56) References Cited

U.S. PATENT DOCUMENTS

| | | | | |
|---|---|---|---|---|
| 5,790,675 A * | 8/1998 | Patarin | ........................... | 713/180 |
| 8,515,058 B1 * | 8/2013 | Gentry | ............................ | 380/28 |
| 2007/0022293 A1 * | 1/2007 | Hayashi et al. | ............... | 713/176 |
| 2008/0013716 A1 * | 1/2008 | Ding | ............................... | 380/30 |
| 2010/0183147 A1 * | 7/2010 | Billet et al. | ...................... | 380/30 |
| 2013/0073855 A1 * | 3/2013 | Kipnis et al. | .................. | 713/171 |
| 2013/0129090 A1 * | 5/2013 | Kipnis et al. | .................. | 380/255 |
| 2013/0177151 A1 * | 7/2013 | Sella et al. | ...................... | 380/30 |

(Continued)

OTHER PUBLICATIONS

International Search Report issued Aug. 21, 2012 in PCT/JP2012/068324.

(Continued)

*Primary Examiner* — Michael R Vaughan
(74) *Attorney, Agent, or Firm* — Sony Corporation

(57) ABSTRACT

A signature verification apparatus including a signature acquisition unit configured to acquire a digital signature including first information generated based on a pair of multi-order multivariate polynomials $F=(f_1, \ldots, f_m)$ defined in a ring K, a signature key s which is an element of a set $K^n$, and a document M and a plurality of pieces of second information for verifying that the first information is generated using the signature key s based on the data M, the pair of multi-order multivariate polynomials F, and vectors $y=(f_1(s), \ldots, f_m(s))$, and a signature verification unit configured to verify legitimacy of the document M by confirming whether or not the first information is restorable using the plurality of pieces of second information included in the digital signature. The pair of multivariate polynomials F and the vectors y are public keys.

7 Claims, 19 Drawing Sheets

(56) References Cited

U.S. PATENT DOCUMENTS

| | | | |
|---|---|---|---|
| 2013/0294601 A9* | 11/2013 | Kipnis et al. | 380/255 |
| 2014/0215222 A1* | 7/2014 | Sakumoto et al. | 713/176 |
| 2015/0010144 A1* | 1/2015 | Sakumoto et al. | 380/30 |

OTHER PUBLICATIONS

Koichi Sakumoto, et al., "Public-key identification schemes based on multivariate quadratic polynomials", Advances in Cryptology—CRYPTO 2011, Lecture Notes in Computer Science, vol. 6841, 2011, pp. 706-723 with cover page.

M. Abdalla, et al., "From identification to signatures via the Fiat-Shamir transform: Minimizing assumptions for security and forward-security", Proceedings of Eurocrypt, vol. 2332, 2002, pp. 1-27 with cover pages.

Fumiko Sato, "Trends of web services security: WS-Security and WS-SX (WS-SecureExchange) specifications", Joho Shori, vol. 48, No. 6, Jun. 2007, pp. 646 to 652 with English translation.

Kaoru Kurosawa, et al., Gendai Ango no Kiso Riron, first edition, Corona Publishing Co., Ltd., Mar. 31, 2004, pp. 98 to 100 with English translation.

Koichi Sakumoto, et al., "Public-key identification schemes based on multivariate quadratic polynomials", Advances in Cryptology—CRYPTO 2011, Lecture Notes in Computer Science, vol. 6841, 2011, 19 pages (PowerPoint Slides).

Jacques Patarin, et al., "Quartz, 128-bit long digital signatures", CT-RSA, 2001, pp. 282-297.

Jacques Patarin, "Asymmetric cryptography with a hidden monomial and a candidate algorithm for ~ 64 bits asymmetric signatures", CP8 TRANSAC, 1998, pp. 45-60.

U.S. Appl. No. 14/370,817, filed Jul. 7, 2014, Sakumoto, et al.
U.S. Appl. No. 14/131,554, filed Jan. 8, 2014, Sakumoto.
U.S. Appl. No. 14/237,030, filed Feb. 4, 2014, Sakumoto.
U.S. Appl. No. 14/236,959, filed Feb. 4, 2014, Sakumoto.
U.S. Appl. No. 14/237,010, filed Feb. 4, 2014, Sakumoto.
U.S. Appl. No. 14/236,703, filed Feb. 3, 2014, Sakumoto.
U.S. Appl. No. 14/235,240, filed Jan. 27, 2014, Sakumoto.
U.S. Appl. No. 14/239,931, filed Feb. 20, 2014, Hiwatari, et al.
U.S. Appl. No. 14/237,460, filed Feb. 6, 2014, Hiwatari, et al.
Japanese Office Action issued on Apr. 14, 2015 in patent application no. 2011-185946.

* cited by examiner

EXAMPLE OF HASH FUNCTION STRUCTURE $M = m_1 \| m_2 \| m_3 \| \cdots \| m_z$

· IV : Initial Value
· $CV_i$: Chaining Value
· CF: Compression Function

NORMAL MOUNTING METHOD
(DIGITAL SIGNATURE SCHEME BASED ON 3-PASS SCHEME)

NORMAL MOUNTING METHOD
(DIGITAL SIGNATURE SCHEME BASED ON 5-PASS SCHEME)

FIG. 15

EXTRACTION METHOD #1

(UNIFORM RANDOM NUMBERS OF M BINARY SYMBOLS)
$X_{2M}$ : 0110110010101110010 ⋯ 0101100100

⇓

(2-BIT GROUPING: 2 BINARY SYMBOLS → 1 TERNARY SYMBOL)

01 | 10 | 11 | 00 | 10 | 10 | 11 | 00 | 10 | ⋯ | 01 | 01 | 10 | 01 | 00
‖ ‖ ‖ ‖ ‖ ‖ ‖ ‖ ‖     ‖ ‖ ‖ ‖ ‖
$X_{22}$ :  1   2   ×   0   1   2   ×   0   2     1   1   2   1   0

$X_{22} > 2$     $X_{22} > 2$
IS EXCLUDED   IS EXCLUDED

FIG. 16

EXTRACTION METHOD #2

(UNIFORM RANDOM NUMBERS OF M BINARY SYMBOLS)
$X_{2M}$ : 0110110010101110010 ⋯ 0101100100

⇓

(NO GROUPING: M BINARY SYMBOLS → L TERNARY SYMBOLS)
$X_{2M}$ : 0110110010101110010 ⋯ 0101100100

$X_{2M} > 3^L$ IS EXCLUDED

EXTRACTION METHOD #3

(UNIFORM RANDOM NUMBERS OF M BINARY SYMBOLS)
$X_{2M}$: 011011001010110010 ⋯ 0101100100

⇩

(k-BIT GROUPING: k BINARY SYMBOLS → L TERNARY SYMBOLS)
01101 | 10010 | 10110 | 010 ⋯ | 01011 | 00100

∥
$X_{2k}$

↑

$X_{2k} > 3^L$ IS EXCLUDED

STRUCTURING TECHNIQUE #1

SIGNATURE VERIFICATION APPARATUS, SIGNATURE VERIFICATION METHOD, PROGRAM, AND RECORDING MEDIUM

TECHNICAL FIELD

The present technology relates to a signature verification apparatus, a signature verification method, a program, and a recording medium.

BACKGROUND ART

With the rapid development of information processing technologies and communication technologies, documents have been digitized rapidly regardless of whether the documents are public or private. With the digitization of such documents, many individuals and companies have a considerable interest in security management of electronic documents. Countermeasures against tampering acts such as wiretapping or forgery of electronic documents have been actively studied in various fields in response to an increase in this interest. Regarding the wiretapping of electronic documents, security is ensured, for example, by encrypting the electronic documents. Further, regarding the forgery of electronic documents, security is ensured, for example, by using digital signatures. However, when the encryption or the digital signature to be used does not have high tampering resistance, sufficient security is not ensured.

The digital signature is used for specifying the author of an electronic document. Accordingly, the digital signature should be able to be generated only by the author of the electronic document. If a malicious third party is able to generate the same digital signature, such third party can impersonate the author of the electronic document. That is, an electronic document is forged by the malicious third party. Various opinions have been expressed regarding the security of the digital signature to prevent such forgery. As digital signature schemes that are currently widely used, a RSA signature scheme and a DSA signature scheme are known, for example.

The RSA signature scheme takes "difficulty of prime factorisation of a large composite number (hereinafter, prime factorisation problem)" as a basis for security. Also, the DSA signature scheme takes "difficulty of solving discrete logarithm problem" as a basis for security. These bases are based on that algorithms that efficiently solve the prime factorisation problem and the discrete logarithm problem by using a classical computer do not exist. That is, the difficulties mentioned above suggest the computational difficulty of a classical computer. However, it is said that solutions to the prime factorisation problem and the discrete logarithm problem can be efficiently calculated when a quantum computer is used.

Similarly to the RSA signature scheme and the DSA signature scheme, many of the digital signature schemes and public-key authentication schemes that are currently used also take difficulty of the prime factorisation problem or the discrete logarithm problem as a basis for security. Thus, if the quantum computer is put to practical use, security of such digital signature schemes and public-key authentication schemes will not be ensured. Accordingly, realizing new digital signature schemes and public-key authentication schemes is desired that take as a basis for security a problem different from problems such as the prime factorisation problem and the discrete logarithm problem that can be easily solved by the quantum computer. As a problem which is not easily solved by the quantum computer, there is a problem related to a multivariate polynomial, for example.

For example, as digital signature schemes that take the multivariate polynomial problem as a basis for security, those based on Matsumoto-Imai (MI) cryptography, Hidden Field Equation (HFE) cryptography, Oil-Vinegar (OV) signature scheme, and Tamed Transformation Method (TTM) cryptography are known. For example, a digital signature scheme based on the HFE is disclosed in the following non-patent literatures 1 and 2.

CITATION LIST

Non-Patent Literature

Non-Patent Literature 1: Jacques Patarin, Asymmetric Cryptography with a Hidden Monomial, CRYPTO 1996, pp. 45-60

Non-Patent Literature 2: Patarin, J., Courtois, N., and Goubin, L., QUARTZ, 128-Bit Long Digital Signatures, In Naccache, D., Ed. Topics in Cryptology—CT-RSA 2001 (San Francisco, Calif., USA, April 2001), vol. 2020 of Lecture Notes in Computer Science, Springer-Verlag., pp. 282-297.

SUMMARY OF INVENTION

Technical Problem

As described above, the multivariate polynomial problem is an example of a problem called NP-hard problem which is difficult to solve even when using the quantum computer. Normally, a public-key authentication scheme that uses the multivariate polynomial problem typified by the HFE or the like uses a multi-order multivariate simultaneous equation with a special trapdoor. For example, a multi-order multivariate simultaneous equation $F(x_1, \ldots, x_n)=y$ related to $x_1, \ldots, x_n$, and linear transformations A and B are provided, and the linear transformations A and B are secretly managed. In this case, the multi-order multivariate simultaneous equation F and the linear transformations A and B are the trapdoors.

An entity that knows the trapdoors F, A, and B can solve an equation $B(F(A(x_1, \ldots, x_n)))=y'$ related to $x_1, \ldots, x_n$. On the other hand, the equation $B(F(A(x_1, \ldots, x_n)))=y'$ related to $x_1, \ldots, x_n$ is not solved by an entity that does not know the trapdoors F, A, and B. By using this mechanism, a public-key authentication scheme and a digital signature scheme that take the difficulty of solving a multi-order multivariate simultaneous equation as a basis for security can be realized.

As mentioned above, in order to realize the public-key authentication scheme or the digital signature scheme, it is necessary to prepare a special multi-order multivariate simultaneous equation satisfying $B(F(A(x_1, \ldots, x_n)))=y$. Further, at the time of the signature generation, it is necessary to solve the multi-order multivariate simultaneous equation F. For this reason, the available multi-order multivariate simultaneous equation F has been limited to relatively easily soluble equations. That is, in the past schemes, only a multi-order multivariate simultaneous equation $B(F(A(x_1, \ldots, x_n)))=y$ of a combined form of three functions (trapdoors) B, F, and A that can be relatively easily solved has been used, and thus it is difficult to ensure sufficient security.

In light of the above-mentioned circumstances, the present technology has been devised to provide a novel and improved signature verification apparatus, a novel and improved signature verification method, a novel and improved program, and a novel and improved recording medium capable of realizing signature verification of a digital signature scheme that is efficient and has high security with a small memory using multi-order multivariate simultaneous equations for which a means of efficiently solving (trapdoor) is not known.

Solution to Problem

According to an embodiment of the present technology, there is provided a signature verification apparatus including a signature acquisition unit configured to acquire a digital signature including first information generated based on a pair of multi-order multivariate polynomials $F=(f_1, \ldots, f_m)$ defined in a ring K, a signature key s which is an element of a set $K^n$, and a document M and a plurality of pieces of second information necessary for verifying that the first information is generated using the signature key s based on the document M, the pair of multi-order multivariate polynomials F, and vectors $y=(f_1(s), \ldots, f_m(s))$, and a signature verification unit configured to verify legitimacy of the document M by confirming whether or not the first information is restorable using the plurality of pieces of second information included in the digital signature. The pair of multivariate polynomials F and the vectors y are public keys. The signature acquisition unit acquires a predetermined number of the pieces of second information. The signature verification unit restores the first information sequentially using the acquired predetermined number of pieces of second information and erases the second information unnecessary in a restoring process in an unnecessary stage at which the second information becomes unnecessary.

According to another embodiment of the present technology, there is provided a signature verification method including a step of acquiring a digital signature including first information generated based on a pair of multi-order multivariate polynomials $F=(f_1, \ldots, f_m)$ defined in a ring K, a signature key s which is an element of a set $K^n$, and a document M and a plurality of pieces of second information necessary for verifying that the first information is generated using the signature key s based on the document M, the pair of multi-order multivariate polynomials F, and vectors $y=(f_1(s), \ldots, f_m(s))$, and a step of verifying legitimacy of the document M by confirming whether or not the first information is restorable using the plurality of pieces of second information included in the digital signature. The pair of multivariate polynomials F and the vectors y are public keys. In the step of acquiring the digital signature, a predetermined number of the pieces of second information are acquired. In the step of verifying the legitimacy, the first information is restored sequentially using the acquired predetermined number of pieces of second information and the second information unnecessary in a restoring process is erased in an unnecessary stage at which the second information becomes unnecessary.

According to another embodiment of the present technology, there is provided a program causing a computer to realize a signature acquisition function of acquiring a digital signature including first information generated based on a pair of multi-order multivariate polynomials $F=(f_1, \ldots, f_m)$ defined in a ring K, a signature key s which is an element of a set $K^n$, and a document M and a plurality of pieces of second information necessary for verifying that the first information is generated using the signature key s based on the document M, the pair of multi-order multivariate polynomials F, and vectors $y=(f_1(s), \ldots, f_m(s))$, and a signature verification function of verifying legitimacy of the document M by confirming whether or not the first information is restorable using the plurality of pieces of second information included in the digital signature. The pair of multivariate polynomials F and the vectors y are public keys. The signature acquisition function acquires a predetermined number of the pieces of second information. The signature verification function restores the first information sequentially using the acquired predetermined number of pieces of second information and erases the second information unnecessary in a restoring process in an unnecessary stage at which the second information becomes unnecessary.

According to another embodiment of the present technology, there is provided a computer-readable recording medium having a program recorded thereon, the program causing a computer to realize a signature acquisition function of acquiring a digital signature including first information generated based on a pair of multi-order multivariate polynomials $F=(f_1, \ldots, f_m)$ defined in a ring K, a signature key s which is an element of a set $K^n$, and a document M and a plurality of pieces of second information necessary for verifying that the first information is generated using the signature key s based on the document M, the pair of multi-order multivariate polynomials F, and vectors $y=(f_1(s), \ldots, f_m(s))$, and a signature verification function of verifying legitimacy of the document M by confirming whether or not the first information is restorable using the plurality of pieces of second information included in the digital signature. The pair of multivariate polynomials F and the vectors y are public keys. The signature acquisition function acquires a predetermined number of the pieces of second information. The signature verification function restores the first information sequentially using the acquired predetermined number of pieces of second information and erases the second information unnecessary in a restoring process in an unnecessary stage at which the second information becomes unnecessary.

Advantageous Effects of Invention

According to the present technology described above, it is possible to realize signature verification of a digital signature scheme that is efficient and has high security with a small memory using multi-order multivariate simultaneous equations for which a means of efficiently solving (trapdoor) is not known.

BRIEF DESCRIPTION OF DRAWINGS

FIG. 15 is an explanatory diagram for describing a method (extraction method #1) of extracting ternary random numbers from binary random numbers.

FIG. 16 is an explanatory diagram for describing a method (extraction method #2) of extracting ternary random numbers from binary random numbers.

DESCRIPTION OF EMBODIMENTS

Figure 1:
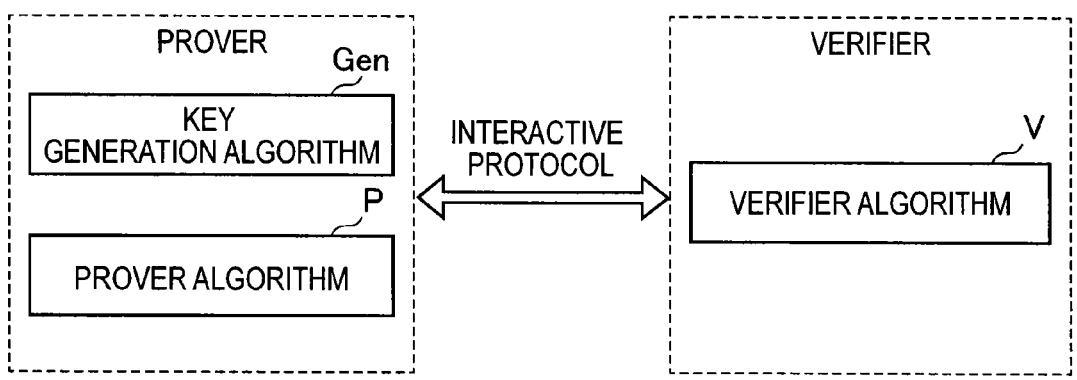
FIG. 1 is an explanatory diagram for describing an algorithm structure related to a public-key authentication scheme.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

[Flow of Description]

Here, a flow of the description of embodiments of the present technology to be made below will be briefly described. First, an algorithm structure of a public-key authentication scheme will be described with reference to FIG. 1. Next, an algorithm structure of a digital signature scheme will be described with reference to FIG. 2. Next, an n-pass public-key authentication scheme will be described with reference to FIG. 3.

Next, an example of an algorithm structure related to a 3-pass public-key authentication scheme will be described with reference to FIGS. 4 and 5. Next, an example of an algorithm structure related to a 5-pass public-key authentication scheme will be described with reference to FIGS. 6 and 7. Next, a method of modifying the efficient algorithms related to the 3-pass and 5-pass public-key authentication schemes into algorithms of the digital signature scheme will be described with reference to FIGS. 8 and 9.

Next, methods of reducing a memory amount necessary for signature verification at the time of execution of the algorithms of the digital signature scheme related to the embodiments herein will be described with reference to FIGS. 10 to 14. Next, methods of efficiently extracting ternary random numbers from binary random numbers will be described with reference to FIGS. 15 to 19. Next, methods of efficiently substituting coefficients of the multivariate polynomials will be described with reference to FIGS. 20 and 21. Next, a hardware configuration example of an information processing apparatus capable of realizing each algorithm according to the embodiments of the present technology will be described with reference to FIG. 22. Finally, a summary of the technical spirit of the embodiments herein and operational advantageous effects obtained from the technical spirit will be described in brief.

(Detailed Articles)
1. Introduction
  1-1: Algorithm of Public-Key Authentication Scheme
  1-2: Algorithms for Digital Signature Scheme
  1-3: N-pass Public-key Authentication Scheme
2. Algorithm Structures Related to 3-pass Public-key Authentication Scheme
  2-1: Example of Specific Algorithm Structure
  2-2: Example of Parallelized Algorithm Structure
3: Algorithm Structure Related to 5-pass Public-key Authentication Scheme
  3-1: Example of Specific Algorithm Structure
  3-2: Example of Parallelized Algorithm Structure
4: Modification of Digital Signature Scheme
  4-1: Modification of 3-pass Public-key Authentication Scheme into Digital Signature Scheme
  4-2: Modification of 5-pass Public-key Authentication Scheme into Digital Signature Scheme
5: Method of Reducing Memory Amount Necessary for Signature Verification
  5-1: Structure of Hash Function
  5-2: Example of Application to Digital Signature Scheme Based on 3-pass Scheme
  5-3: Example of Application to Digital Signature Scheme Based on 5-pass Scheme
6: Method of Extracting Ternary Random Number Sequence from Binary Random Number Sequence
  6-1: Extraction Method #1 (2-bit Grouping)
  6-2: Extraction Method #2 (No Grouping)
  6-3: Extraction Method #3 (k-bit Grouping)
    6-3-1: Basic Structure
    6-3-2: Additional Extraction Method
7: Method of Efficiently Substituting Coefficients of Multivariate Polynomials
  7-1: Basic Determination
  7-2: Structuring of Data
    7-2-1: Structuring Technique #1
    7-2-2: Structuring Technique #2
    7-2-3: Structuring Technique #3
8: Example of Hardware Configuration
9: Summary <1. Introduction>

The embodiments herein relate to a public-key authentication scheme and a digital signature scheme that base their safety on the difficulty of solving multi-order multivariate simultaneous equations. However, the embodiments herein differ from techniques of the related art such as HFE digital signature schemes, and relate to a public-key authentication scheme and a digital signature scheme that utilize multi-order multivariate simultaneous equations that lack a means of efficient solving (trapdoors). First, algorithms for a public-key authentication scheme, algorithms for a digital signature scheme, and an n-pass public-key authentication scheme will be briefly summarized.

[1-1: Algorithm of Public-Key Authentication Scheme]

First, an overview of algorithm of a public-key authentication scheme will be described with reference to FIG. 1. FIG. 1 is an explanatory diagram for describing an algorithm structure of a public key authentication scheme.

A public key authentication is used when a person (prover) convinces another person (verifier) that she is the prover herself by using a public key pk and a secret key sk. For example, a public key $pk_A$ of a prover A is made known to the verifier B. On the other hand, a secret key $sk_A$ of the prover A is secretly managed by the prover A. According to the public key authentication scheme, a person who knows the secret key $sk_A$ corresponding to the public key $pk_A$ is regarded as the prover A herself.

In order for the prover A to prove to the verifier B that she is the prover A herself using the public-key authentication setup, the prover A, via an interactive protocol, presents proof to the verifier B indicating that she knows the secret key $sk_A$ corresponding to the public key $pk_A$. The proof indicating the prover A knows the secret key $sk_A$ is then presented to verifier B, and in the case where the verifier B is able to confirm that proof, the validity of the prover A (the fact that the prover A is herself) is proven.

However, a public-key authentication setup demands the following conditions in order to ensure safety.

The first condition is "to lower as much as possible the probability of falsification being established, at the time the interactive protocol is performed, by a falsifier not having the secret key sk". That this first condition is satisfied is called "soundness." In other words, the soundness means that "falsification is not established during the execution of an interactive protocol by a falsifier not having the secret key sk with a non-negligible probability". The second condition is that, "even if the interactive protocol is performed, information on the secret key $sk_A$ of the prover A is not at all leaked to the verifier B". That this second condition is satisfied is called "zero knowledge."

Conducting public-key authentication safely involves using an interactive protocol exhibiting both soundness and zero-knowledge. If an authentication process were hypothetically conducted using an interactive protocol lacking soundness and zero-knowledge, there would be a definite chance of false verification and a definite chance of the divulgence of secret key information, and thus the validity of the prover would not be proven even if the process itself is completed successfully. Consequently, the question of how to ensure the soundness and zero-knowledge of a session protocol is important.

(Model)

In a model of the public key authentication scheme, two entities, namely a prover and a verifier, are present, as shown in FIG. 1. The prover generates a pair of public key pk and secret key sk unique to the prover by using a key generation algorithm Gen. Then, the prover performs an interactive protocol with the verifier by using the pair of secret key sk and public key pk generated by using the key generation algorithm Gen. At this time, the prover performs the interactive protocol by using a prover algorithm P. As described above, in the interactive protocol, the prover proves to the verifier, by using the prover algorithm P, that she possesses the secret key sk.

On the other hand, the verifier performs the interactive protocol by using a verifier algorithm V, and verifies whether or not the prover possesses the secret key corresponding to the public key that the prover has published. That is, the verifier is an entity that verifies whether or not a prover possesses a secret key corresponding to a public key. As described, a model of the public key authentication scheme is configured from two entities, namely the prover and the verifier, and three algorithms, namely the key generation algorithm Gen, the prover algorithm P and the verifier algorithm V.

Figure 10:
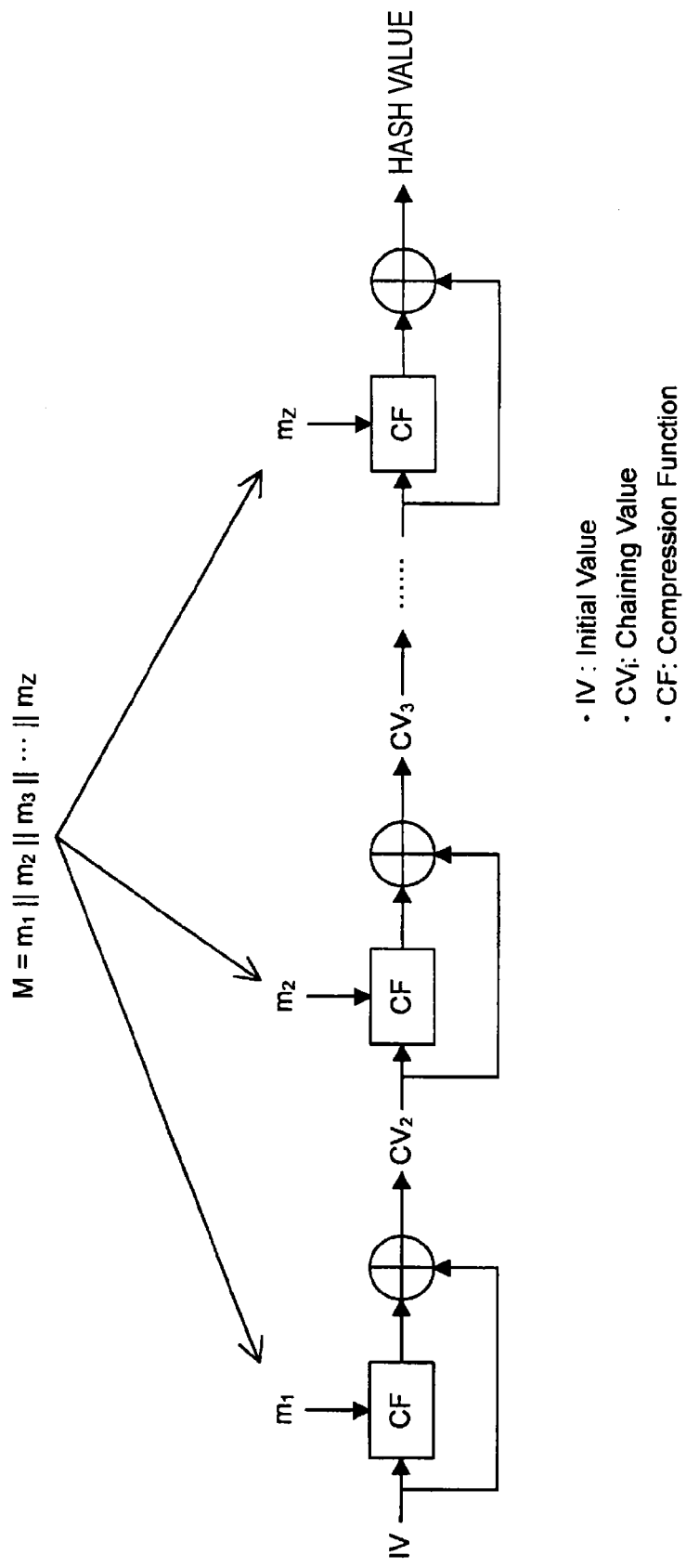
FIG. 10 is an explanatory diagram for describing an example of a hash function structure.

Additionally, expressions "prover" and "verifier" are used in the following description, but these expressions strictly mean entities. Therefore, the subject that performs the key generation algorithm Gen and the prover algorithm P is an information processing apparatus corresponding to the entity "prover". Similarly, the subject that performs the verifier algorithm V is an information processing apparatus. The hardware configuration of these information processing apparatuses is as shown in FIG. 10, for example. That is, the key generation algorithm Gen, the prover algorithm P, and the verifier algorithm V are performed by a CPU 902 based on a program recorded on a ROM 904, a RAM 906, a storage unit 920, a removable recording medium 928, or the like.

(Key Generation Algorithm Gen)

The key generation algorithm Gen is used by a prover. The key generation algorithm Gen is an algorithm for generating a pair of public key pk and secret key sk unique to the prover. The public key pk generated by the key generation algorithm Gen is published. Furthermore, the published public key pk is used by the verifier. On the other hand, the secret key sk generated by the key generation algorithm Gen is secretly managed by the prover. The secret key sk that is secretly managed by the prover is used to prove to the verifier of possession of the secret key sk corresponding to the public key pk by the prover. Formally, the key generation algorithm Gen is represented as formula (1) below as an algorithm that takes security parameter $1\zeta$ ($\lambda$ is an integer of 0 or more) as an input and outputs the secret key sk and the public key pk.

[Math 1]

$$(sk, pk) \leftarrow \text{Gen}(1^\lambda) \qquad (1)$$

(Prover Algorithm P)

The prover algorithm P is used by a prover. The prover algorithm P is an algorithm for proving to the verifier that the prover possesses the secret key sk corresponding to the public key pk. In other words, the prover algorithm P is an algorithm that takes the public key pk and the secret key sk as inputs and performs the interactive protocol.

(Verifier Algorithm V)

The verifier algorithm V is used by the verifier. The verifier algorithm V is an algorithm that verifies whether or not the prover possesses the secret key sk corresponding to the public key pk during the session protocol. The verifier algorithm V is an algorithm that accepts a public key pk as input, and outputs 0 or 1 (1 bit) according to the execution results of the session protocol. At this point, the verifier decides that the prover is invalid in the case where the verifier algorithm V outputs 0, and decides that the prover is valid in the case where the verifier algorithm V outputs 1. Formally, the verifier algorithm V is expressed as in the following formula (2).

[Math 2]

$$0/1 \leftarrow V(pk) \qquad (2)$$

As above, realizing meaningful public-key authentication involves having the interactive protocol satisfy the two conditions of soundness and zero-knowledge. However, proving that the prover possesses the secret key sk involves the prover executing a procedure dependent on the secret key sk, and after notifying the verifier of the result, causing the verifier to execute verification based on the content of the notification. The procedure dependent on the secret key sk is executed to ensure soundness. At the same time, no information about the secret key sk should be revealed to the verifier. For this reason, the above key generation algorithm Gen, prover algorithm P, and verifier algorithm V are skillfully designed to satisfy these requirements.

The foregoing thus summarizes the algorithms in a public-key authentication scheme.

[1-2: Algorithms for Digital Signature Scheme]

Figure 2:
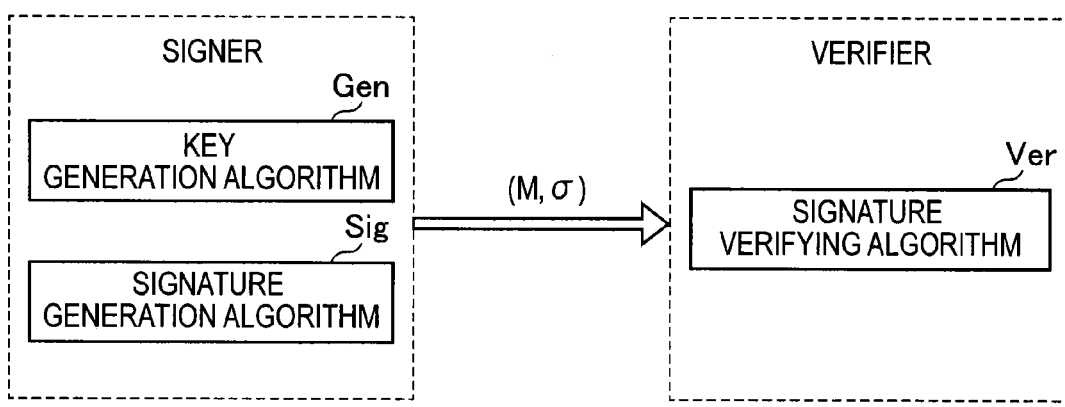
FIG. 2 is an explanatory diagram for describing an algorithm structure related to a digital signature scheme.

Next, algorithms for a digital signature scheme will be summarized with reference to FIG. 2. FIG. 2 is an explanatory diagram summarizing algorithms for a digital signature scheme.

Unlike paper documents, it is not possible to physically sign or affix a seal to digitized data. For this reason, proving the creator of digitized data involves an electronic setup yielding effects similarly to physically signing or affixing a seal to a paper document. This setup is digital signatures. A digital signature refers to a setup that associates given data with signature data known only to the creator of the data, provides the signature data to a recipient, and verifies that signature data on the recipient's end.

(Model)

As illustrated in FIG. 2, the two identities of signer and verifier exist in a model of a digital signature scheme. In addition, the model of a digital signature scheme is made up of three algorithms: a key generation algorithm Gen, a signature generation algorithm Sig, and a signature verifying algorithm Ver.

The signer uses the key generation algorithm Gen to generate a paired signature key sk and verification key pk unique to the signer. The signer also uses the signature generation algorithm Sig to generate a digital signature q to attach to a message M. In other words, the signer is an entity that attaches a digital signature to a message M. Meanwhile, the verifier uses the signature verifying algorithm Ver to verify the digital signature attached to the message M. In other words, the verifier is an entity that verifies the digital signature q in order to confirm whether or not the creator of the message M is the signer.

Note that although the terms "signer" and "verifier" are used in the description hereinafter, these terms ultimately mean entities. Consequently, the agent that executes the key generation algorithm Gen and the signature generation algorithm Sig is an information processing apparatus corresponding to the "signer" entity. Similarly, the agent that executes the signature verifying algorithm Ver is an information processing apparatus. The hardware configuration of these information processing apparatus is as illustrated in FIG. 28, for example. In other words, the key generation algorithm Gen, the signature generation algorithm Sig, and the signature verifying algorithm Ver are executed by a device such as a CPU 902 on the basis of a program recorded onto a device such as ROM 904, RAM 906, a storage unit 920, or a removable recording medium 928.

(Key Generation Algorithm Gen)

The key generation algorithm Gen is used by the signer. The key generation algorithm Gen is an algorithm that generates a paired signature key sk and verification key pk unique to the signer. The verification key pk generated by the key generation algorithm Gen is made public. Meanwhile, the signer keeps the signature key sk generated by the key generation algorithm Gen a secret. The signature key sk is then used to generate digital signature q to attach to a message M. For example, the key generation algorithm Gen accepts a security parameter $1^p$ (where p is an integer equal to or greater than 0) as input, and outputs a signature key sk and a verification key pk. In this case, the key generation algorithm Gen may be expressed formally as in the following formula (3).

[Math 3]

$$(sk, pk) \leftarrow \text{Gen}(1^\lambda) \qquad (3)$$

(Signature Generation Algorithm Sig)

The signature generation algorithm Sig is used by the signer. The signature generation algorithm Sig is an algorithm that generates a digital signature q to be attached to a message M. The signature generation algorithm Sig is an algorithm that accepts a signature key sk and a message M as input, and outputs a digital signature q. The signature generation algorithm Sig may be expressed formally as in the following formula (4).

[Math 4]

$$\sigma \leftarrow \text{Sig}(sk, M) \qquad (4)$$

(Signature Verifying Algorithm Ver)

The signature verifying algorithm Ver is used by the verifier. The signature verifying algorithm Ver is an algorithm that verifies whether or not the digital signature q is a valid digital signature for the message M. The signature verifying algorithm Ver is an algorithm that accepts a signer's verification key pk, a message M, and a digital signature q as input, and outputs 0 or 1 (1 bit). The signature verifying algorithm Ver may be expressed formally as in the following formula (5). At this point, the verifier decides that the digital signature q is invalid in the case where the signature verifying algorithm Ver outputs 0 (the case where the verification key pk rejects the message M and the digital signature q), and decides that the digital signature q is valid in the case where the signature verifying algorithm Ver outputs 1 (the case where the verification key pk accepts the message M and the digital signature q).

[Math 5]

$$0/1 \leftarrow \text{Ver}(pk, M, \sigma) \qquad (5)$$

The foregoing thus summarizes the algorithms in a digital signature scheme.

[1-3: N-Pass Public-Key Authentication Scheme]

Figure 3:
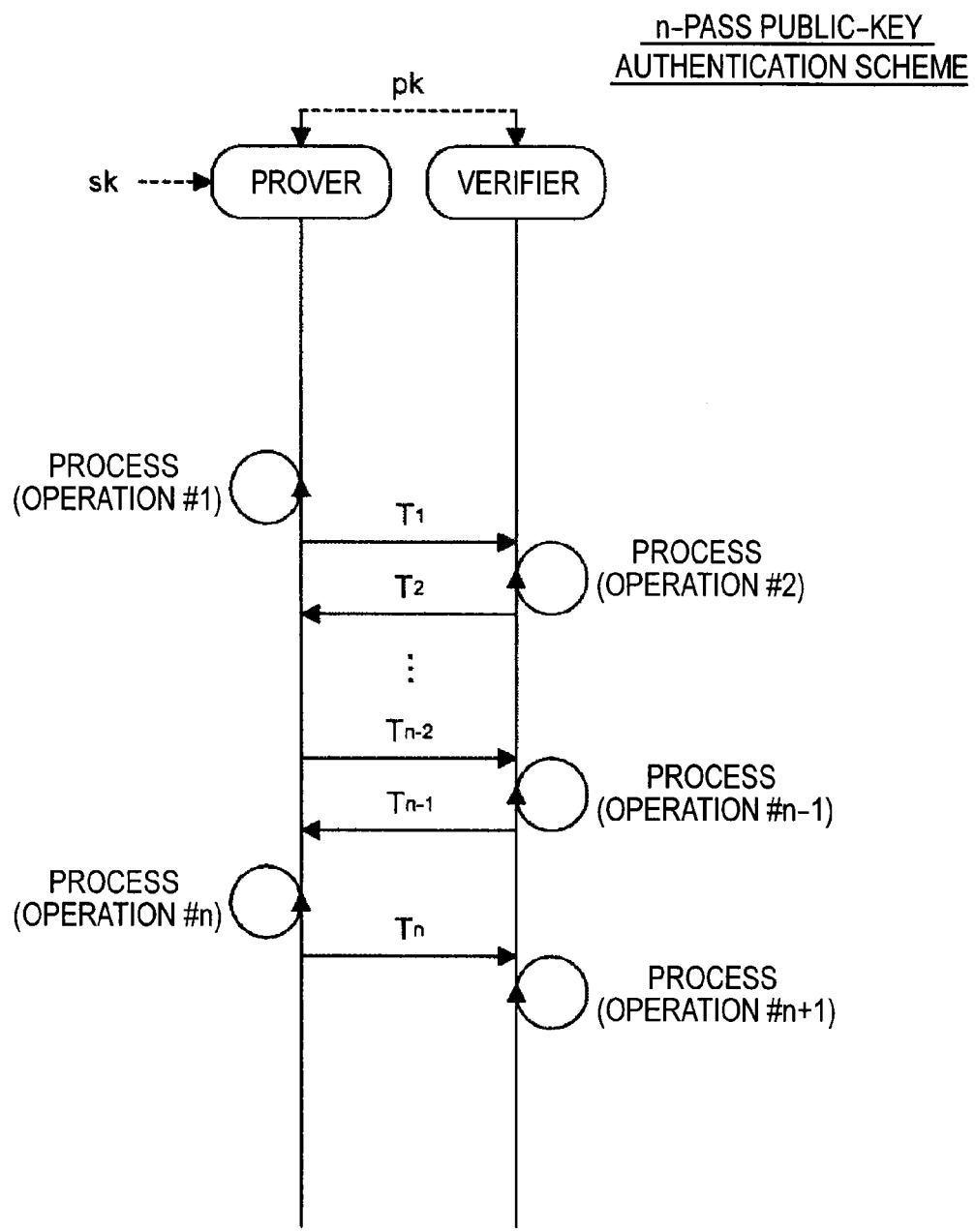
FIG. 3 is an explanatory diagram for describing an algorithm structure related to an n-pass public-key authentication scheme.

Next, an n-pass public-key authentication scheme will be described with reference to FIG. 3. FIG. 3 is an explanatory diagram illustrating an n-pass public-key authentication scheme.

As above, a public-key authentication scheme is an authentication scheme that proves to a verifier that a prover possesses a secret key sk corresponding to a public key pk during an interactive protocol. In addition, the interactive protocol has to satisfy the two conditions of soundness and zero-knowledge. For this reason, during the interactive protocol both the prover and the verifier exchange information n times while executing respective processes, as illustrated in FIG. 3.

In the case of an n-pass public-key authentication scheme, the prover executes a process using the prover algorithm P (operation #1), and transmits information $T_1$ to the verifier. Subsequently, the verifier executes a process using the verifier algorithm V (operation #2), and transmits information $T_2$ to the prover. This execution and processes and transmission of information $T_k$ is successively conducted for k=3 to n, and lastly, a process (operation #n+1) is executed. Transmitting and receiving information n times in this way is thus called an "n-pass" public-key authentication scheme.

The foregoing thus describes an n-pass public-key authentication scheme.

<2. Algorithm Structures Related to 3-Pass Public-Key Authentication Scheme>

Hereinafter, algorithms related to a 3-pass public-key authentication scheme will be described. Note that in the following description, a 3-pass public-key authentication scheme may also be referred to as a "3-pass scheme" in some cases.

[2-1: Example of Specific Algorithm Structure (FIG. 4)]

Figure 4:
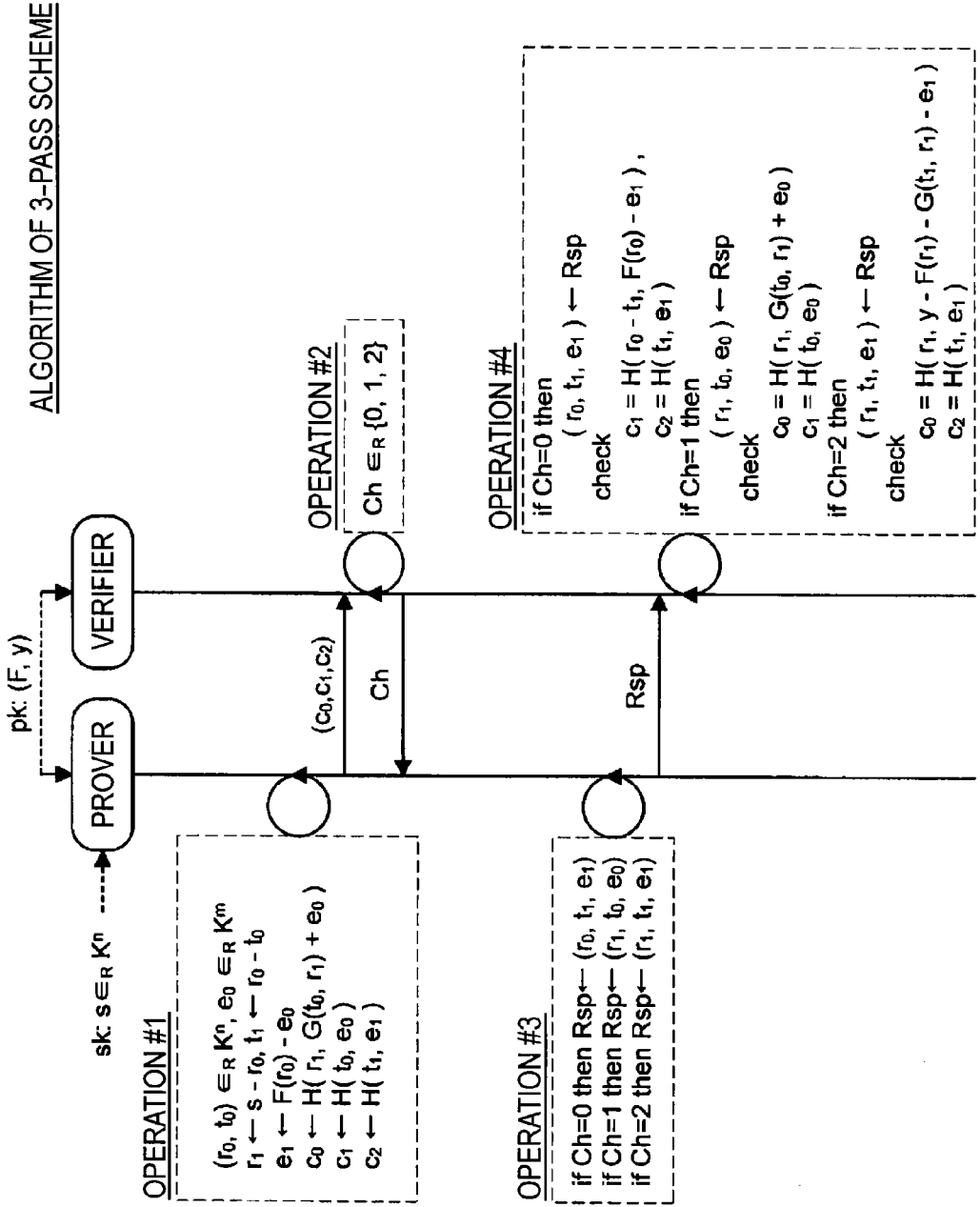
FIG. 4 is an explanatory diagram for describing an efficient algorithm related to a 3-pass public-key authentication scheme.

First, an example of a specific algorithm structure related to the 3-pass scheme will be introduced with reference to FIG. 4. FIG. 4 is an explanatory diagram for describing a specific algorithm structure related to the 3-pass scheme. Here, a case in which a pair of quadratic polynomials $(f_1(x), \ldots, f_m(x))$ are used as a part of the public key pk will be described. Here, a quadratic polynomial $f_i(x)$ is assumed to be expressed as in the following formula (6). Also, a vector $(x_1, \ldots, x_n)$ is represented as x and a pair of quadratic multivariate polynomials $(f_1(x), \ldots, f_m(x))$ are represented as multivariate polynomials $F(x)$.

[Math 6]

$$f_i(x_1, \ldots, x_n) = \sum_{j,k} a_{ijk} x_j x_k + \sum_j b_{ij} x_j \qquad (6)$$

Also, the pair of quadratic polynomials $(f_1(x), \ldots, f_m(x))$ can be expressed as in the following formula (7). Also, $A_1, \ldots, A_m$ is an n×n matrix. Further, each of $b_1, \ldots, b_m$ is an n×1 vector.

[Math 7]

$$F(x) = \begin{pmatrix} f_1(x) \\ \vdots \\ f_m(x) \end{pmatrix} = \begin{pmatrix} x^T A_1 x + b_1^T x \\ \vdots \\ x^T A_m x + b_m^T x \end{pmatrix} \qquad (7)$$

When this expression is used, a multivariate polynomial F can be expressed as in the following formula (8) and formula (9). From the following formula (10), it can easily be confirmed that this expression is satisfied.

[Math 8]

$$F(x+y) = F(x) + F(y) + G(x, y) \qquad (8)$$

$$G(x, y) = \begin{pmatrix} y^T (A_1^T + A_1) x \\ \vdots \\ y^T (A_m^T + A_m) x \end{pmatrix} \qquad (9)$$

-continued $$\begin{aligned} f_l(x+y) &= (x+y)^T A_l (x+y) + b_l^T (x+y) \qquad (10) \\ &= x^T A_l x + x^T A_l y + y^T A_l x + y^T A_l y + b_l^T x + b_l^T y \\ &= f_l(x) + f_l(y) + x^T A_l y + y^T A_l x \\ &= f_l(x) + f_l(y) + x^T (A_l^T)^T y + y^T A_l x \\ &= f_l(x) + f_l(y) + (A_l^T x)^T y + y^T A_l x \\ &= f_l(x) + f_l(y) + y^T (A_l^T x) + y^T A_l x \\ &= f_l(x) + f_l(y) + y^T (A_l^T + A_l) x \end{aligned}$$

When dividing $F(x+y)$ into a first portion dependent on x, a second portion dependent on y, and a third portion dependent on both x and y in this way, the term $G(x, y)$ corresponding to the third portion becomes bilinear with respect to x and y. Hereinafter, the term $G(x, y)$ is also referred to as a bilinear term. Using this property enables the construction of an efficient algorithm.

For example, use the vector $t_0$ that is an element of the set $K^n$ and the vector $e_0$ that is an element of the set $K^m$ to express the multivariate polynomial $F_1(x)$, which is used to mask the multivariate polynomial $F(x+r)$, as $F_1(x)=G(x, t_0)+e_0$. In this case, the sum of the multivariate polynomial $F(x+r_0)$ and $G(x)$ is expressed as in formula (11) below. Here, when $t_1=r_0+t_0$, $e_1=F(r_0)+e_0$, the multivariate polynomial $F_2(x)=F(x+r_0)+F_1(x)$ can be expressed by the vector $t_1$ which is an element of the set $K^n$ and the vector $e_1$ that is an element of the set $K^m$. For this reason, when $F_1(x)=G(x, t_0)+e_0$ is set, $F_1$ and $F_2$ can be expressed by using a vector in $K^n$ and a vector in $K^m$, and thus it is possible to realize an efficient algorithm of which a data size necessary for communication is small.

[Math 9]

$$\begin{aligned} F(x+r_0) + F_1(x) &= F(x) + F(r_0) + G(x, r_0) + G(x, t_0) + e_0 \qquad (11) \\ &= F(x) + G(x, r_0 + t_0) + F(r_0) + e_0 \end{aligned}$$

Additionally, information on $r_0$ is not leaked at all from $F_2$ (or $F_1$). For example, even when $e_1$ and $t_1$ (or $e_0$ and $t_0$) are given, the information on $r_0$ is not known at all as long as $e_0$ and $t_0$ (or $e_1$ and $t_1$) are not known. Accordingly, the zero knowledge is ensured. Hereinafter, an algorithm of the 3-pass scheme constructed based on the foregoing logic will be described. The algorithm of the 3-pass scheme to be described here is made up of a key generation algorithm Gen, a prover algorithm P, and a verifier algorithm V to be described below.

(Key Generation Algorithm Gen)

The key generation algorithm Gen generates m multivariate polynomials $f_1(x_1, \ldots, x_n), \ldots, f_m(x_1, \ldots, x_n)$ defined in a ring k and a vector $s=(s_1, \ldots, s_n)$ that is an element of a set $K^n$. Next, the generation algorithm Gen calculates $y=(y_1, \ldots, y_m) \leftarrow (f_1(s), \ldots, f_m(s))$. Also, the generation algorithm Gen sets $(f_1(x_1, \ldots, x_n), \ldots, f_m(x_1, \ldots, x_n), y)$ in the public key pk and sets s as a secret key. Hereinafter, a vector $(x_1, \ldots, x_n)$ is represented as x and a pair of multivariate polynomials $(f_1(x), \ldots, f_m(x))$ is represented as $F(x)$.

(Prover Algorithm P, Verifier Algorithm V)

Hereinafter, a process performed by the prover algorithm P and a process performed by the verifier algorithm V during the interactive protocol will be described with reference to FIG. 4. During the foregoing interactive protocol, a prover does not leak information on the secret key s at all to a verifier and expresses to the verifier that "she herself knows s satisfying y=F(s)." On the other hand, the verifier verifies whether or not the prover knows s satisfying y=F(s). The public key pk is assumed to be made known to the verifier. Also, the secret key s is assumed to be secretly managed by the prover. Hereinafter, the description will be made with reference to the flowchart illustrated in FIG. 4.

Operation #1:

As illustrated in FIG. 4, the prover algorithm P first randomly generates the vector $r_0$, $t_0$ that is an element of the set $K^n$, and the vector $e_0$ that is an element of the set $K^m$. Subsequently, the prover algorithm P calculates $r_1 \leftarrow s-r_0$. This calculation is equivalent to masking the secret key s with the vector $r_0$. Additionally, the prover algorithm P calculates $t_1 \leftarrow r_0 - t_0$. Subsequently, the prover algorithm P calculates $e_1 \leftarrow F(r_0) - e_0$.

Operation #1 (Continued):

Subsequently, the prover algorithm P calculates $c_0 \leftarrow H(r_1, G(t_0, r_1) + e_0)$. Subsequently, the prover algorithm P calculates $c_1 \leftarrow H(t_0, e_0)$. Subsequently, the prover algorithm P calculates $c_2 \leftarrow H(t_1, e_1)$. The message $(c_0, c_1, c_2)$ generated in operation #1 is sent to the verifier algorithm V.

Operation #2:

Upon receiving the message $(c_0, e_1, c_2)$, the verifier algorithm V selects which verification pattern to use from among three verification patterns. For example, the verifier algorithm V may select a numerical value from among three numerical values $\{0, 1, 2\}$ representing verification patterns, and set the selected numerical value in a challenge Ch. This challenge Ch is sent to the prover algorithm P.

Operation #3:

Upon receiving the challenge Ch, the prover algorithm P generates a response Rsp to send to the verifier algorithm V in response to the received challenge Ch. In the case where Ch=0, the prover algorithm P generates a response Rsp=$(r_0, t_1, e_1)$. In the case where Ch=1, the prover algorithm P generates a response Rsp=$(r_1, t_0, e_0)$. In the case where Ch=2, the prover algorithm P generates a response Rsp=$(r_1, t_1, e_1)$. The response Rsp generated in operation #3 is sent to the verifier algorithm V.

Operation #4:

Upon receiving the response Rsp, the verifier algorithm V executes the following verification process using the received response Rsp.

In the case where Ch=0, the verifier algorithm V verifies whether or not the equality of $c_1 = H(r_0 - t_1, F(r_0) - e_1)$ holds. In addition, the verifier algorithm V verifies whether or not the equality of $c_2 = H(t_1, e_1)$ holds. The verifier algorithm V outputs the value 1 to indicate authentication success in the case where these verifications all succeed, and outputs the value 0 to indicate authentication failure in the case where a verification fails.

In the case where Ch=1, the verifier algorithm V verifies whether or not the equality of $c_0 = H(r_1, G(t_0, r_1) + e_0)$ holds. In addition, the verifier algorithm V verifies whether or not the equality of $c_1 = H(t_0, e_0)$ holds. The verifier algorithm V outputs the value 1 to indicate authentication success in the case where these verifications all succeed, and outputs the value 0 to indicate authentication failure in the case where a verification fails.

In the case where Ch=2, the verifier algorithm V verifies whether or not the equality of $c_0 = H(r_1, y - F(r_1) - G(t_1, r_1) - e_1)$ holds. In addition, the verifier algorithm V verifies whether or not the equality of $c_2 = H(t_1, e_1)$ holds. The verifier algorithm V outputs the value 1 to indicate authentication success in the case where these verifications all succeed, and outputs the value 0 to indicate authentication failure in the case where a verification fails.

The example of the efficient algorithm structure related to the 3-pass scheme has been described above.

(2-2: Example of Parallelized Algorithm Structure (FIG. 5))

Next, a method of parallelizing the algorithm of the 3-pass scheme illustrated in FIG. 4 will be described with reference to FIG. 5. However, further description of the structure of the key generation algorithm Gen will be omitted.

In fact, applying the above session protocol makes it possible to keep the probability of a successful forgery to ⅔ or less. Consequently, executing the session protocol twice makes it possible to keep the probability of a successful forgery to $(⅔)^2$ or less. Furthermore, if the session protocol is executed N times, the probability of a successful forgery becomes $(⅔)^N$, and if N is set to a sufficiently large number (N=140, for example), the probability of a successful forgery becomes negligibly small.

Conceivable methods of executing the interactive protocol multiple times include a serial method in which the exchange of message, challenge, and response is sequentially repeated multiple times, and a parallel method in which multiple messages, challenges, and responses are exchanged in a single exchange, for example. Also, a hybrid type method combining the serial method and the parallel method is also conceivable. Here, algorithms that execute the above interactive protocol related to the 3-pass scheme in parallel (hereinafter designated parallelized algorithms) will now be described with reference to FIG. 5.

Figure 5:
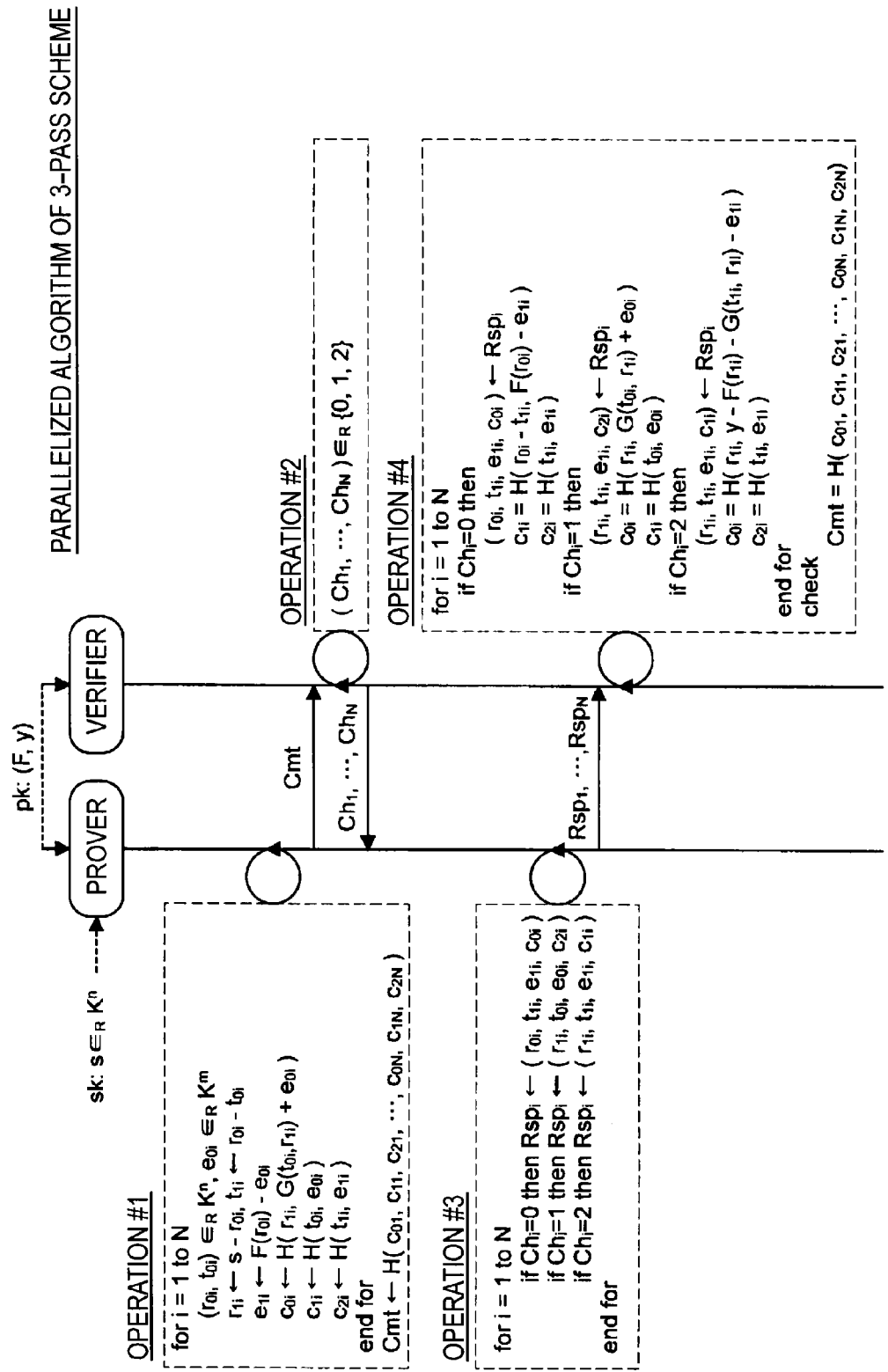
FIG. 5 is an explanatory diagram for describing parallelization of an efficient algorithm related to a 3-pass public-key authentication scheme.

Operation #1:

As described in FIG. 5, the prover algorithm P first executes the following processes (1) to (6) for i=1 to N.

Process (1): The prover algorithm P randomly generates the vectors $r_{0i}$, $t_{0i}$ that are elements of the set $K^n$, and the vector $e_{0i}$ that is an element of the set $K^m$.

Process (2): The prover algorithm P calculates $r_{1i} \leftarrow s - r_{0i}$. This calculation is equivalent to masking the secret key s with the vector $r_{0i}$. Additionally, the prover algorithm P calculates $t_{1i} \leftarrow r_{0i} + t_{0i}$.

Process (3): The prover algorithm P calculates $e_{1i} \leftarrow F(r_{0i}) - e_{0i}$.

Process (4): The prover algorithm P calculates $c_{0i} \leftarrow H(r_{1i}, G(r_{1i}, t_{0i}) + e_{0i})$ Process (5): The prover algorithm P calculates $c_{1i} \leftarrow H(t_{0i}, e_{0i})$.

Process (6): The prover algorithm P calculates $c_{2i} \leftarrow H(t_{1i}, e_{1i})$.

Operation #1 (Continued):

After executing the above processes (1) to (6) for i=1 to N, the prover algorithm P calculates Cmt$\leftarrow H(c_{01}, e_{11}, c_{21}, \ldots, c_{0N}, c_{1N}, c_{2N})$. The hash value Cmt generated in operation #1 is sent to the verifier algorithm V. In this way, the message $(c_{01}, c_{11}, c_{21}, \ldots, c_{0N}, c_{1N}, c_{2N})$ is converted into a hash value before being sent to the verifier algorithm V, thus enabling a reduction in the communication volume.

Operation #2:

Upon receiving the hash value Cmt, the verifier algorithm V selects which verification pattern to use from among three verification patterns, for each of i=1 to N. For example, the verifier algorithm V may, for each of i=1 to N, select a numerical value from among three numerical values $\{0, 1, 2\}$ representing verification patterns, and set the selected numerical value in a challenge $Ch_i$. The challenges $Ch_1, \ldots, Ch_N$ are sent to the prover algorithm P.

Operation #3:

Upon receiving the challenges $Ch_1, \ldots, Ch_N$, the prover algorithm P generates responses $Rsp_1, \ldots, Rsp_N$ to send to the verifier algorithm V in response to each of the received challenges $Ch_1, \ldots, Ch_N$. In the case where $Ch_i=0$, the prover algorithm P generates a response $Rsp_i = (r_{0i}, t_{1i}, e_{1i}, c_{0i})$. In the case where $Ch_i=1$, the prover algorithm P generates a response $Rsp_i=(r_{1i}, t_{0i}, e_{0i}, c_{2i})$. In the case where $Ch_i=2$, the prover algorithm P generates a response $Rsp_i=(r_{1i}, t_{1i}, e_{1i}, c_{1i})$.

The responses $Rsp_1, \ldots, Rsp_N$ generated in operation #3 are sent to the verifier algorithm V.

Operation #4:

Upon receiving the responses $Rsp_1, \ldots, Rsp_N$, the verifier algorithm V executes the following processes (1) to (3) for i=1 to N, using the received responses $Rsp_1, \ldots, Rsp_N$. Herein, the verifier algorithm V executes the process (1) for the case where $Ch_i=0$, the process (2) in the case where $Ch_i=1$, and the process (3) in the case where $Ch_i=2$.

Process (1): In the case where $Ch_i=0$, the verifier algorithm V retrieves $(r_{0i}, t_{1i}, e_{1i}, c_{0i})$ from $Rsp_i$. Subsequently, the verifier algorithm V calculates $c_{1i}=H(r_{0i}-t_{1i}, F(r_{0i})-e_{1i})$. In addition, the verifier algorithm V calculates $c_{2i}=H(t_{1i}, e_{1i})$. The verifier algorithm V then stores $(c_{0i}, c_{1i}, c_{2i})$.

Process (2): In the case where $Ch_i=1$, the verifier algorithm V retrieves $(r_{1i}, t_{0i}, e_{0i}, c_{2i})$ from $Rsp_i$. Subsequently, the verifier algorithm V calculates $c_{0i}=H(r_{1i}, G(t_{0i}, r_{1i})+e_{0i})$. In addition, the verifier algorithm V calculates $c_{1i}=H(t_{0i}, e_{0i})$. The verifier algorithm V then stores $(c_{0i}, c_{1i}, c_{2i})$.

Process (3): In the case where $Ch_i=2$, the verifier algorithm V retrieves $(r_{1i}, t_{1i}, e_{1i}, c_{1i})$ from $Rsp_i$. Subsequently, the verifier algorithm V calculates $c_{0i}=H(r_{1i}, y-F(r_{1i})-G(t_{1i}, r_{1i})-e_{1i})$. In addition, the verifier algorithm V calculates $c_{2i}=H(t_{1i}, e_{1i})$. The verifier algorithm V then stores $(c_{0i}, c_{1i}, c_{2i})$.

After executing the above processes (1) to (3) for i=1 to N, the verifier algorithm V verifies whether or not the equality of $Cmt=H(c_{01}, c_{11}, c_{21}, \ldots, c_{0N}, c_{1N}, c_{2N})$ holds. The verifier algorithm V outputs the value 1 to indicate authentication success in the case where the verification succeeds, and outputs the value 0 to indicate authentication failure in the case where the verification fails.

The example of the structures of the parallelized efficient algorithms related to the 3-pass scheme has been described above.

<3: Algorithm Structure Related to 5-Pass Public-Key Authentication Scheme>

Next, algorithms related to a 5-pass public-key authentication scheme will be described. Note that in the following description, a 5-pass public-key authentication scheme may also be referred to as a "5-pass scheme" in some cases.

In the case of the 3-pass scheme, the probability of the false verification is ⅔ per time of the interactive protocol. However, in the case of the 5-pass scheme, the probability of the false verification per time of the interactive protocol is ½+1/q. Here, q is an order of a ring to be used. Accordingly, when the order of the ring is sufficiently large, the probability of the false verification per time of the 5-pass scheme can be reduced, and thus the probability of the false verification can be sufficiently reduced by executing the interactive protocol a small number of times.

For example, when the probability of the false verification is desired to be equal to or less than $½^n$, the interactive protocol has to be executed n/(log 3−1)=1.701n times or more in the 3-pass scheme. On the other hand, when the probability of the false verification is desired to be equal to or less than $½^n$, the interactive protocol has to be executed n/(1−log(1+1/q)) times or more in the 5-pass scheme. Accordingly, when q=24, a communication quantity necessary to realize the same security level is less in the 5-pass scheme than in the 3-pass scheme.

[3-1: Example of Specific Algorithm Structure (FIG. 6)]

Figure 6:
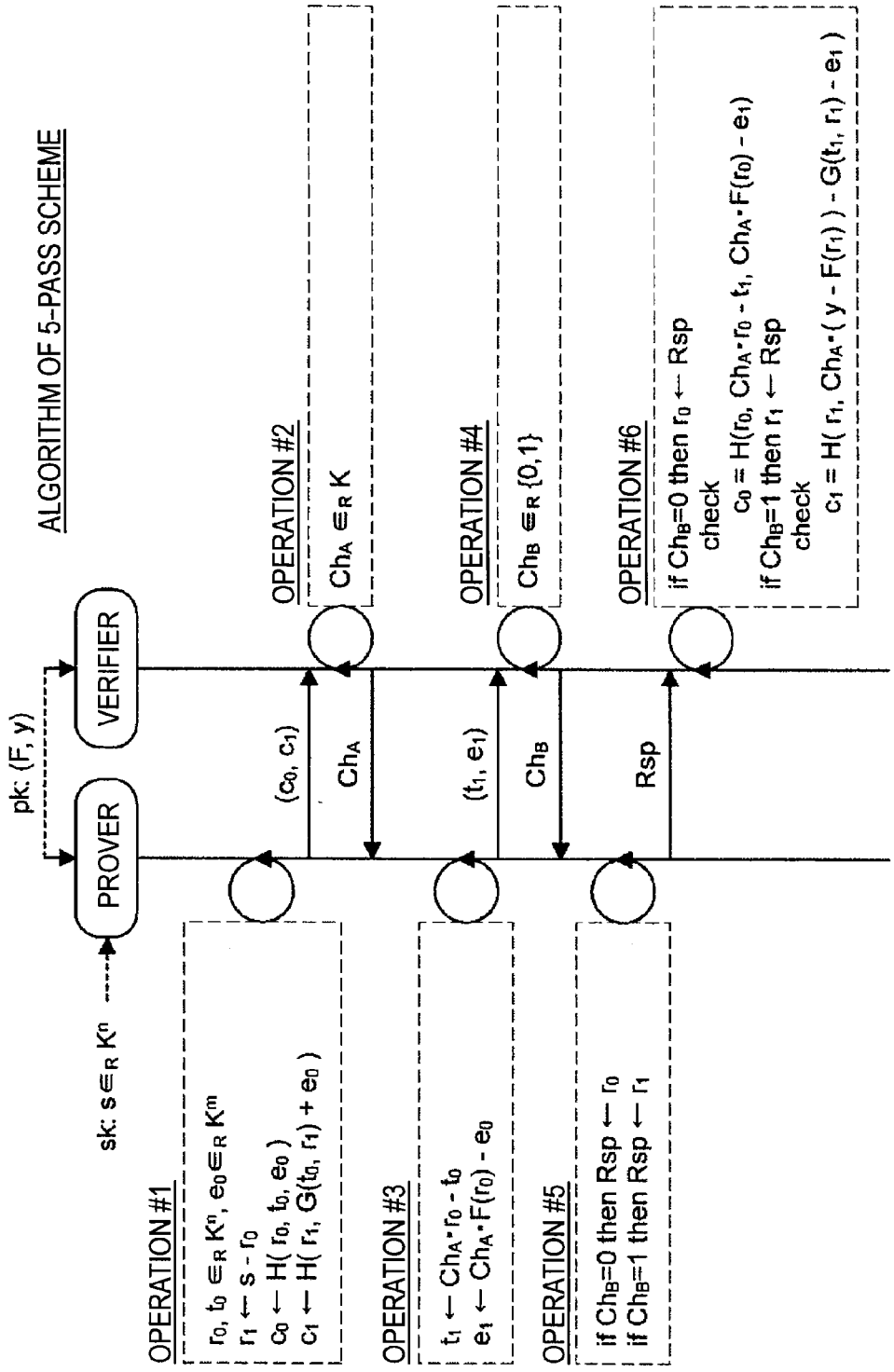
FIG. 6 is an explanatory diagram for describing an example of an efficient algorithm related to the 5-pass public-key authentication scheme.

First, an example of a specific algorithm structure related to the 5-pass scheme will be introduced with reference to FIG. 6. FIG. 6 is an explanatory diagram for describing a specific algorithm structure related to the 5-pass scheme. Here, a case in which a pair of quadratic polynomials $(f_1(x), \ldots, f_m(x))$ are used as a part of the public key pk will be described. Here, a quadratic polynomial $f_i(x)$ is assumed to be expressed as in the foregoing formula (6). Also, a vector $(x_1, \ldots, x_n)$ is represented as x and a pair of quadratic multivariate polynomials $(f_1(x), \ldots, f_m(x))$ are represented as multivariate polynomials F(x).

As in the efficient algorithms related to the 3-pass scheme, two vectors, i.e., the vector $t_0$ that is an element of the set $K^n$ and the vector $e_0$ that is an element of the set $K^m$, are used to express the multivariate polynomial $F_1(x)$, which is used to mask the multivariate polynomial $F(x+r_0)$, as $F_1(x)=G(x,t_0)+e_0$. When this expression is used, a relation expressed in the following formula (12) can be obtained for the multivariate polynomial $F(x+r_0)$.

[Math 10]

$$\begin{aligned}Ch_A \cdot F(x+r_0) + F_1(x) &= Ch_A \cdot F(x) + Ch_A \cdot F(r_0) + \\ &\quad Ch_A \cdot G(x, r_0) + G(x, t_0) + e_0 \\ &= Ch_A \cdot F(x) + G(x, Ch_A \cdot r_0 + t_0) + Ch_A \cdot \\ &\quad F(r_0) + e_0\end{aligned} \quad (12)$$

For this reason, when $t_1=Ch_A \cdot r_0+t_0$, $e_1=Ch_A \cdot F(r_0)+e_0$, the multivariate polynomial $F_2(x)=Ch_A \cdot F(x+r_0)+F_1(x)$ after the masking can also be expressed by two vectors, i.e., the vector $t_1$ which is an element of the set $K^n$ and the vector $e_1$ that is an element of the set $K^m$. For this reason, when $F_1(x)=G(x, t_0)+e_0$ is set, $F_1$ and $F_2$ can be expressed by using a vector in $K^n$ and a vector in $K^m$, and thus it is possible to realize an efficient algorithm of which a data size necessary for communication is small.

Additionally, information on $r_0$ is not at all leaked from $F_2$ (or $F_1$). For example, even when $e_1$ and $t_1$ (or $e_0$ and $t_0$) are given, the information on $r_0$ is not known at all as long as $e_0$ and $t_0$ (or $e_1$ and $t_1$) are not known. Accordingly, the zero knowledge is ensured. Hereinafter, an algorithm of the 5-pass scheme constructed based on the foregoing logic will be described. The algorithm of the 5-pass scheme to be described here is made up of a key generation algorithm Gen, a prover algorithm P, and a verifier algorithm V to be described below.

(Key Generation Algorithm Gen)

The key generation algorithm Gen generates multivariate polynomials $f_1(x_1, \ldots, x_n), \ldots, f_m(x_1, \ldots, x_n)$ defined in a ring k and a vector $s=(s_1, \ldots, s_n)$ that is an element of a set $K^n$. Next, the key generation algorithm Gen calculates $y=(y_1, \ldots, y_m)\leftarrow(f_1(s), \ldots, f_m(s))$. Also, the key generation algorithm Gen sets $(f_1 \ldots, f_m, y)$ in the public key pk and sets s as a secret key. Hereinafter, a vector $(x_1, \ldots, x_0)$ is represented as x and a pair of multivariate polynomials $(f_1(x), \ldots, f_m(x))$ is represented as F(x).

(Prover Algorithm P, Verifier Algorithm V)

Hereinafter, a process performed by the prover algorithm P and a process performed by the verifier algorithm V during the interactive protocol will be described with reference to FIG. 6. During the foregoing interactive protocol, a prover does not leak information on the secret key s at all to a verifier and expresses to the verifier that "she herself knows s satisfying y=F(s)." On the other hand, the verifier verifies whether or not the prover knows s satisfying y=F(s). The public key pk is assumed to be made known to the verifier. Also, the secret key s is assumed to be secretly managed by the prover. Hereinafter, the description will be made with reference to the flowchart illustrated in FIG. 6.

Operation #1:

As illustrated in FIG. 6, the prover algorithm P randomly generates the vector $r_0$ that is an element of the set $K^n$, the vector $t_0$ that is an element of the set $K^n$, and the vector $e_0$ that is an element of the set $K^m$. Subsequently, the prover algorithm P calculates $r_1 \leftarrow s-r_0$. This calculation is equivalent to masking the secret key s with the vector $r_0$. Subsequently, the prover algorithm P calculates the hash value $c_0$ of the vectors $r_0$, $t_0$, $e_0$. That is, the prover algorithm P calculates $c_0 \leftarrow H(r_0, t_0, e_0)$. Subsequently, the prover algorithm P generates $G(t_0, r_1)+e_0$ and the hash value $c_1$ of $r_1$. That is, the prover algorithm P calculates $c_0 \leftarrow H(r_1, G(t_0, r_1)+e_0)$. The messages $(c_0, c_1)$ generated in operation #1 is sent to the verifier algorithm V.

Operation #2:

Upon receiving the messages $(c_0, c_1)$, the verifier algorithm V randomly selects one number $Ch_A$ from the origins of q rings K and sends the selected number $Ch_A$ to the prover algorithm P.

Operation #3:

Upon receiving the number $Ch_A$, the prover algorithm P calculates $t_1 \leftarrow Ch_A \cdot r_0 - t_0$. Additionally, the prover algorithm P calculates $e_1 \leftarrow Ch_A \cdot F(r_0) - e_0$. The prover algorithm P sends $t_1$ and $e_1$ to the verifier algorithm V.

Operation #4:

Upon receiving $t_1$ and $e_1$, the verifier algorithm V selects which verification pattern to use from between two verification patterns. For example, the verifier algorithm V may select a numerical value from between two numerical values $\{0, 1\}$ representing verification patterns, and set the selected numerical value in a challenge $Ch_B$. This challenge $Ch_B$ is sent to the prover algorithm P.

Operation #5:

Upon receiving the challenge $Ch_B$, the prover algorithm P generates a response Rsp to send to the verifier algorithm V in response to the received challenge $Ch_B$. In the case where $Ch_B=0$, the prover algorithm P generates a response $Rsp=r_0$. In the case where $Ch_B=1$, the prover algorithm P generates a response $Rsp=r_1$. The response Rsp generated in operation #5 is sent to the verifier algorithm V.

Operation #6:

Upon receiving the response Rsp, the verifier algorithm V executes the following verification process using the received response Rsp.

In the case where $Ch_B=0$, the verifier algorithm V executes $r_0 \leftarrow Rsp$. Then, the verifier algorithm V verifies whether or not the equality of $c_0=H(r_0, Ch_A \cdot r_0 - t_1, Ch_A \cdot F(r_0) - e_1)$ holds. The verifier algorithm V outputs the value 1 to indicate authentication success in the case where these verifications all succeed, and outputs the value 0 to indicate authentication failure in the case where a verification fails.

In the case where $Ch_B=1$, the verifier algorithm V executes $r_1 \leftarrow Rsp$. Then, the verifier algorithm V verifies whether or not the equality of $c_1=H_1(r_1, Ch_A \cdot (y-F(r_1))-G(t_1, r_1)-e_1)$ holds. The verifier algorithm V outputs the value 1 to indicate authentication success in the case where these verifications all succeed, and outputs the value 0 to indicate authentication failure in the case where a verification fails.

The example of the efficient algorithm structure related to the 5-pass scheme has been described above.

[3-2: Example of Parallelized Algorithm Structure (FIG. 7)]

Next, a method of parallelizing the algorithm of the 5-pass scheme illustrated in FIG. 6 will be described with reference to FIG. 7. However, further description of the structure of the key generation algorithm Gen will be omitted.

As described above, applying the above interactive protocol related to the 5-pass scheme makes it possible to keep the probability of a successful forgery to $(1/2+1/q)$ or less. Consequently, executing the interactive protocol twice makes it possible to keep the probability of a successful forgery to $(1/2+1/q)^2$ or less. Furthermore, if the interactive protocol is executed N times, the probability of a successful forgery becomes $(1/2+1/q)^N$, and if N is set to a sufficiently large number (N=80, for example), the probability of a successful forgery becomes negligibly small.

Conceivable methods of executing an interactive protocol multiple times include a serial method in which the exchange of message, challenge, and response is sequentially repeated multiple times, and a parallel method in which multiple messages, challenges, and responses are exchanged in a single exchange, for example. Also, a hybrid type method combining the serial method and the parallel method is also conceivable. Here, algorithms that execute the above interactive protocol related to the 5-pass scheme in parallel (hereinafter designated parallelized algorithms) will now be described.

Figure 7:
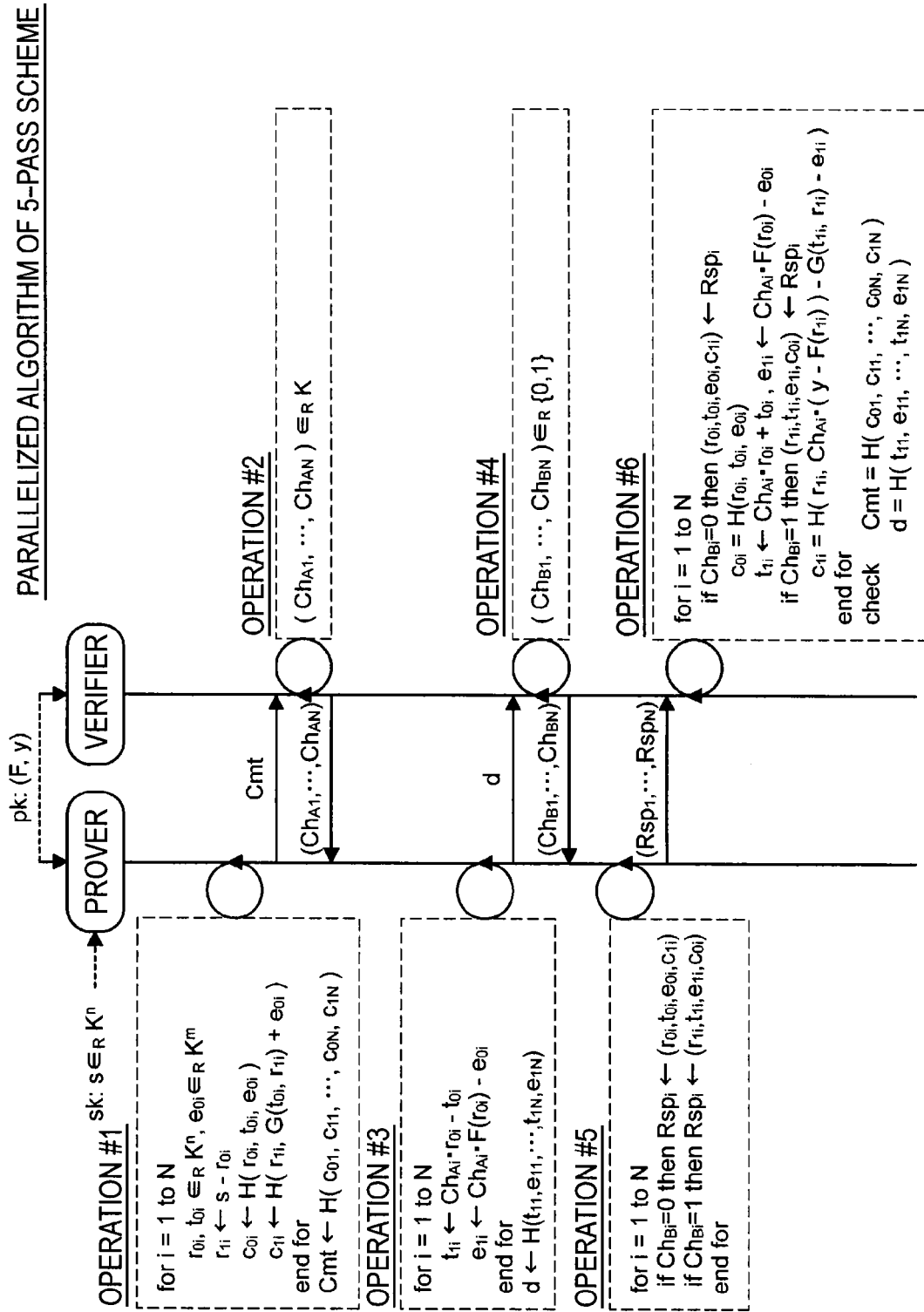
FIG. 7 is an explanatory diagram for describing parallelization of efficient algorithms related to the 5-pass public-key authentication scheme.

Operation #1:

As described in FIG. 7, the prover algorithm P first executes the following processes (1) to (4) for i=1 to N.

Process (1): The prover algorithm P randomly generates the vectors $r_{0i}$, $t_{0i}$ that are elements of the set $K^n$, and the vector $e_{0i}$ that is an element of the set $K^m$.

Process (2): The prover algorithm P calculates $r_{1i} \leftarrow s-r_{0i}$. This calculation is equivalent to masking the secret key s with the vector $r_{0i}$.

Process (3): The prover algorithm P calculates $c_{0i} \leftarrow H(r_{0i}, t_{0i}, e_{0i})$.

Process (4): The prover algorithm P calculates $c_{1i} \leftarrow H(r_{1i}, G(t_{0i}, r_{1i})+e_{0i})$.

After executing the above processes (1) to (4) for i=1 to N, the prover algorithm P executes the hash value $Cmt \leftarrow H(c_{01}, c_{11}, \ldots, c_{0N}, c_{1N})$. The hash value Cmt generated in operation #1 is sent to the verifier algorithm V.

Operation #2:

Upon receiving the hash value Cmt, the verifier algorithm V randomly selects one number $Ch_{Ai}$ from the origins of q rings K for i=1 to N and sends the selected number $Ch_{Ai}$ (i=1 to N) to the prover algorithm P.

Operation #3:

Upon receiving the number $Ch_{Ai}$ (i=1 to N), the prover algorithm P calculates $t_{1i} \leftarrow Ch_{Ai} \cdot r_{0i} - t_{0i}$ for i=1 to N. Additionally, the prover algorithm P calculates $e_{1i} \leftarrow Ch_{Ai} \cdot F(r_{0i}) - e_{0i}$ for i=1 to N. Further, the prover algorithm P calculates the hash value $d \leftarrow H(t_{011}, e_{11}, \ldots, t_{1N}, e_{1N})$. Then, the prover algorithm P sends the hash value to the verifier algorithm V.

Operation #4:

Upon receiving the hash value, the verifier algorithm V selects which verification pattern to use from between two verification patterns for i=1 to N. For example, the verifier algorithm V may select a numerical value from between two numerical values $\{0, 1\}$ representing verification patterns, and set the selected numerical value in a challenge $Ch_{Bi}$. This challenge $Ch_{Bi}$ (i=1 to N) is sent to the prover algorithm P.

Operation #5:

Upon receiving the challenge $Ch_{Bi}$ (i=1 to N), the prover algorithm P generates a response $Rsp_i$ to send to the verifier algorithm V in response to the received challenge $Ch_{Bi}$ for i=1 to N. In the case where $Ch_{Bi}=0$, the prover algorithm P generates a response $Rsp_i=(r_{0i}, c_{1i})$. In the case where $Ch_{Bi}=1$, the prover algorithm P generates a response $Rsp_i=(r_{0i}, t_{0i}, e_{0i}, c_i, t_{1i}, e_{1i}, c_{0i})$. The response $Rsp_i$ (i=1 to N) generated in operation #5 is sent to the verifier algorithm V.

Operation #6:

Upon receiving the response $Rsp_i$ (i=1 to N), the verifier algorithm V executes the following processes (1) and (2) using the received response $Rsp_i$ (i=1 to N).

Process (1): In the case where $Ch_{Bi}=0$, the verifier algorithm V executes $(r_{0i}, t_{0i}, e_{0i}, c_{1i})\leftarrow Rsp_i$. Then, the verifier algorithm V calculates $c_{0i}=H(r_{0i}, t_{0i}, e_{0i})$. Further, the verifier algorithm V calculates $t_{1i}\leftarrow Ch_{Ai}\cdot r_{0i}+t_{0i}$, and $e_{1i}\leftarrow Ch_{Ai}\cdot F(r_{0i})-e_{0i}$. The verifier algorithm V then stores $(c_{0i}, c_{1i}, t_{1i}, e_{1i})$.

Process (2): In the case where $Ch_{Bi}=1$, the verifier algorithm V executes $(r_{1i}, t_{1i}, e_{1i}, c_{0i})\leftarrow Rsp_i$. Then, the verifier algorithm V calculates $c_{1i}=H(r_{1i}-Ch_{Ai}\cdot(y-F(r_{1i}))-G(t_{1i}, r_{1i})-e_{1i})$. The verifier algorithm V then stores $(c_{0i}, c_{1i}, t_{1i}, e_{1i})$.

After executing the processes (1) and (2) for i=1 to N, the verifier algorithm V verifies whether or not the equality of $Cmt=H(c_{01}, c_{11}, \ldots, c_{0N}, c_{1N})$ holds. Further, the verifier algorithm V verifies whether or not the equality of $d=H(t_{11}, e_{11}, \ldots, t_{1N}, e_{1N})$ holds. Then, the verifier algorithm V outputs the value 1 to indicate authentication success in the case where these verifications succeed, and outputs the value 0 to indicate authentication failure in the case where a verification fails.

The example of the structures of the parallelized efficient algorithms related to the 5-pass scheme has been described above.

<4: Modification of Digital Signature Scheme>

Next, a method of modifying the foregoing public-key authentication scheme into a digital signature scheme will be introduced.

When a prover in a model of a public-key authentication scheme matches a signer in a digital signature scheme, an approximation to the model of the digital signature scheme can easily be understood in that only a prover can convince a verifier. Based on this idea, a method of modifying the above-described public-key authentication scheme into a digital signature scheme will be descried.

[4-1: Modification of 3-Pass Public-Key Authentication Scheme into Digital Signature Scheme (FIG. 8)]

First, modification of a public-key authentication scheme of 3-pass into a digital signature scheme will be described.

Figure 8:
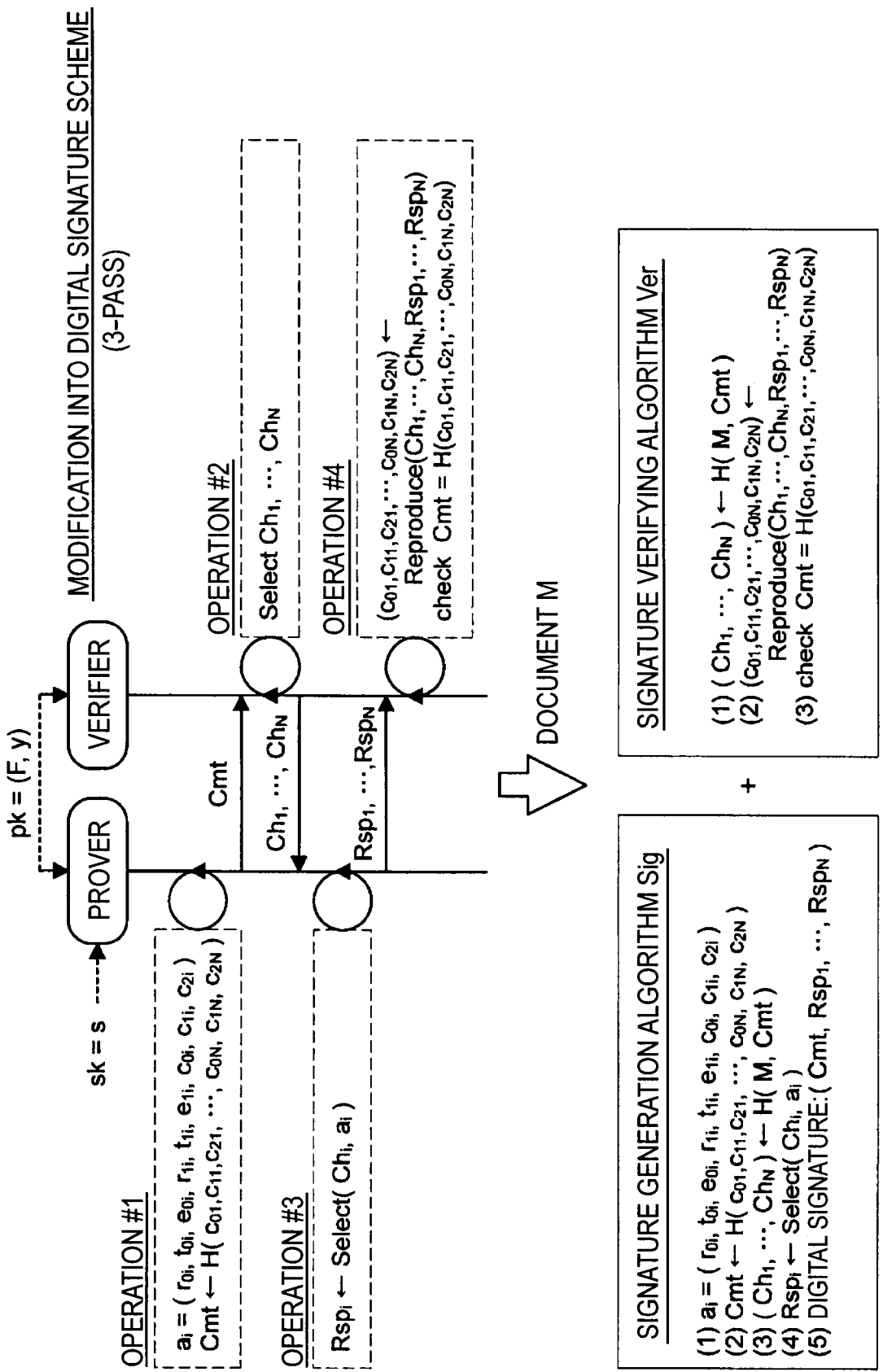
FIG. 8 is an explanatory diagram for describing a method of modifying the efficient algorithm related to the 3-pass public-key authentication scheme into an algorithm of a digital signature scheme.

As illustrated in FIG. 8, an efficient algorithm (for example, see FIG. 5) related to the 3-pass scheme is expressed with interactivity of three times and four operations, i.e., operation #1 to operation #4.

Operation #1 includes a process (1) of generating $a_i=(r_{0i}, t_{0i}, e_{0i}, r_{1i}, t_{1i}, e_{1i}, c_{0i}, c_{1i}, c_{2i})$ and a process (2) of calculating $Cmt\leftarrow H(c_{01}, c_{11}, c_{21}, \ldots, c_{0N}, c_{1N}, c_{2N})$. Cmt generated in operation #1 by the prover algorithm P is sent to the verifier algorithm V.

Operation #2 includes a process of selecting $Ch_1, \ldots, Ch_N$. $Ch_1, \ldots, Ch_N$ selected in operation #2 by the verifier algorithm V are sent to the prover algorithm P.

Operation #3 includes a process of generating $Rsp_1, \ldots, Rsp_N$ using $Ch_1, \ldots, Ch_N$ and $a_1, \ldots, a_N$. This process is expressed as $Rsp_i\leftarrow Select(Ch_i, a_i)$. $Rsp_1, \ldots, Rsp_N$ generated in operation #3 by the prover algorithm P are sent to the verifier algorithm V.

Operation #4 includes a process (1) of reproducing $c_{01}, c_{11}, c_{21}, \ldots, c_{0N}, c_{1N}, c_{2N}$ using $Ch_1, \ldots, Ch_N$ and $Rsp_1, \ldots, Rsp_N$ and a process (2) of verifying $Cmt=H(c_{01}, c_{11}, c_{21}, \ldots, c_{0N}, c_{1N}, c_{2N})$ using the reproduced $c_{01}, c_{11}, c_{21}, \ldots, c_{0N}, c_{1N}, c_{2N}$.

The algorithm of the public-key authentication scheme expressed with the foregoing operation #1 to operation #4 is modified into a signature generation algorithm Sig and a signature verifying algorithm Ver illustrated in FIG. 8.

(Signature Generation Algorithm Sig)

First, the structure of the signature generation algorithm Sig will be described. The signature generation algorithm Sig includes the following processes (1) to (5).

Process (1): The signature generation algorithm Sig generates $a_i=(r_{0i}, t_{0i}, e_{0i}, r_{1i}, t_{1i}, e_{1i}, c_{0i}, c_{1i}, c_{2i})$ Process (2): The signature generation algorithm Sig calculates $Cmt\leftarrow H(c_{01}, c_{11}, c_{21}, \ldots, c_{0N}, c_{1N}, c_{2N})$ Process (3): The signature generation algorithm Sig calculates $(Ch_1, \ldots, Ch_N)\leftarrow H(M, Cmt)$. Here, M is a document to which a signature is attached.

Process (4): The signature generation algorithm Sig calculates $Rsp_i\leftarrow Select(Ch_i, a_i)$.

Process (5): The signature generation algorithm Sig sets $(Cmt, Rsp_1, \ldots, Rsp_N)$ as a signature.

(Signature Verifying Algorithm Ver)

Next, the structure of the signature verifying algorithm Ver will be described. The signature verifying algorithm Ver includes the following processes (1) to (3).

Process (1): The signature verifying algorithm Ver calculates $(Ch_1, \ldots, Ch_N)\leftarrow H(M, Cmt)$.

Process (2): The signature verifying algorithm Ver generates $c_{01}, c_{11}, c_{21}, \ldots, c_{0N}, c_{1N}, c_{2N}$ using $Ch_1, \ldots, Ch_N$ and $Rsp_1, \ldots, Rsp_N$.

Process (3): The signature verifying algorithm Ver verifies $Cmt=H(c_{01}, c_{11}, c_{21}, \ldots, c_{0N}, c_{1N}, c_{2N})$ using the reproduced $c_{01}, c_{11}, c_{21}, \ldots, c_{0N}, c_{1N}, c_{2N}$.

As described above, by matching the prover in the model of the public-key authentication scheme with the signer in the digital signature scheme, the algorithm of the public-key authentication scheme can be modified into the algorithm of the digital signature scheme.

[4-2: Modification of 5-Pass Public-Key Authentication Scheme into Digital Signature Scheme (FIG. 9)]

Next, a modification of the public-key authentication scheme related to the 5-pass into a digital signature scheme will be described.

Figure 9:
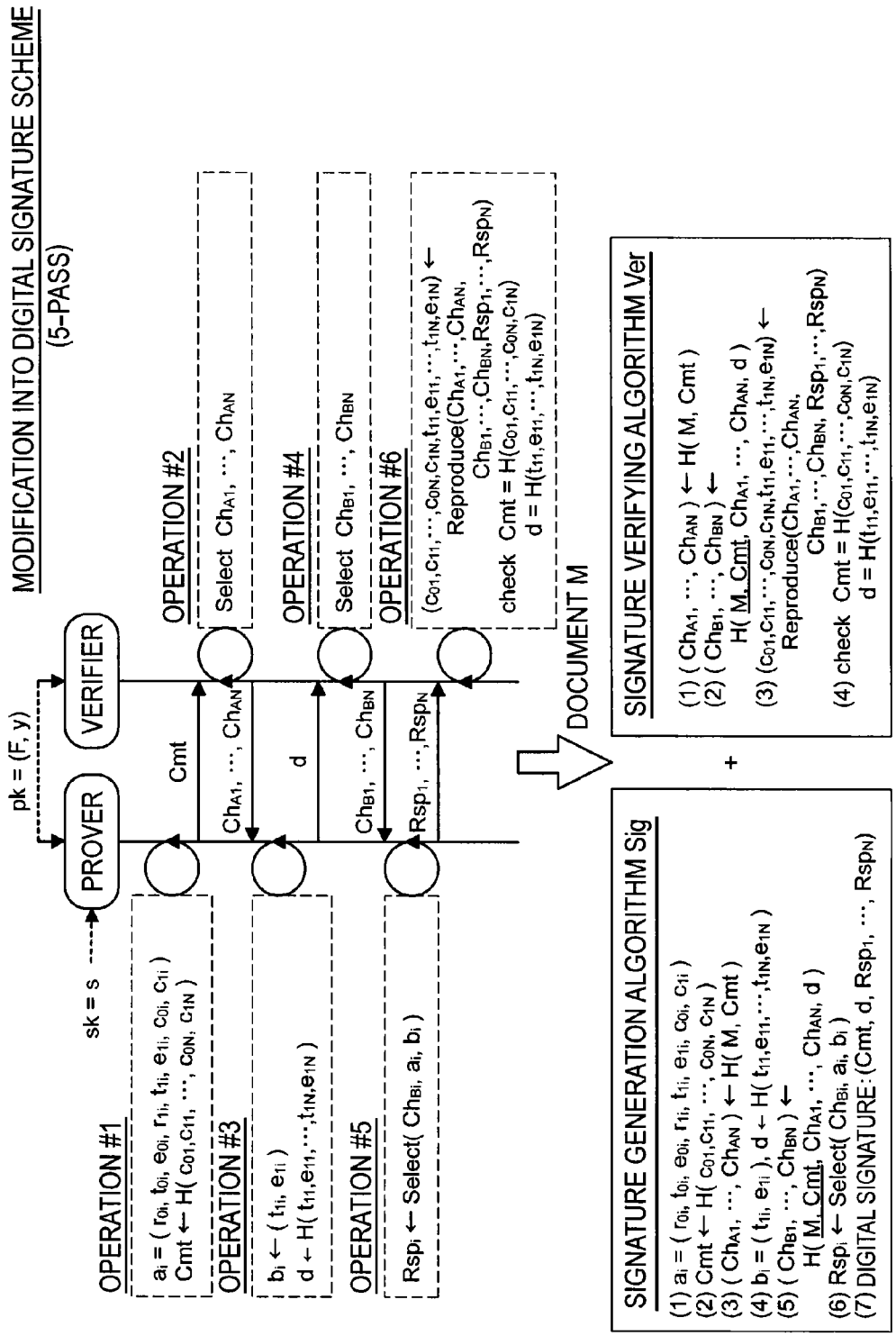
FIG. 9 is an explanatory diagram for describing a method of modifying the efficient algorithm related to the 5-pass public-key authentication scheme into an algorithm of a digital signature scheme.

As illustrated in FIG. 9, an efficient algorithm (for example, see FIG. 7) related to the 5-pass scheme is expressed with interactivity of five times and six operations, i.e., operation #1 to operation #6.

Operation #1 includes a process (1) of generating $a_i=(r_{0i}, t_{0i}, e_{0i}, r_{1i}, t_{1i}, e_{1i}, c_{0i}, c_{1i})$ for i=1 to N and a process (2) of calculating $Cmt\leftarrow H(c_{01}, c_{11}, \ldots, c_{0N}, c_{1N})$. Cmt generated in operation #1 by the prover algorithm P is sent to the verifier algorithm V.

Operation #2 includes a process of selecting $Ch_{A1}, \ldots, Ch_{AN}$. $Ch_{A1}, \ldots, Ch_{AN}$ selected in operation #2 by the verifier algorithm V are sent to the prover algorithm P.

Operation #3 includes a process of generating $b_i=(t_{1i}, e_{1i})$ and a process of generating $d=H(t_{11}, e_{11}, \ldots, t_{1N}, e_{1N})$ for i=1 to N. Here, d generated in operation #3 by the prover algorithm P are sent to the verifier algorithm V.

Operation #4 includes a process of selecting $ChB1, \ldots, Ch_{BN}$. $ChB1, \ldots, Ch_{BN}$ selected in operation #4 by the verifier algorithm V are sent to the prover algorithm P.

Operation #5 includes a process of generating $Rsp_1, \ldots, Rsp_N$ using $Ch_{B1}, \ldots, Ch_{BN}, a_1, \ldots, a_N, b_1, \ldots, b_N$. This process is expressed as $Rsp_i\leftarrow Select(Ch_{Bi}, a_i, b_i)$. $Rsp_1, \ldots, Rsp_N$ generated in operation #5 by the prover algorithm P are sent to the verifier algorithm V.

Operation #6 includes a process of reproducing $c_{01}, c_{11}, \ldots, c_{0N}, c_{1N}, t_{11}, e_{11}, \ldots, t_{1N}, e_{1N}$ using $Ch_{A1}, \ldots, Ch_{AN}, Ch_{B1}, \ldots, Ch_{BN}, Rsp_1, \ldots, Rsp_N$, and a process of verifying $Cmt=H(c_{01}, c_{11}, \ldots, c_{0N}, c_{1N})$ using the reproduced $c_{01}, c_{11}, \ldots, c_{0N}, c_{1N}$) and a process of verifying $d=H(t_{11}, e_{11}, \ldots, t_{1N}, e_{1N})$ The algorithm of the public-key authentication scheme expressed with the foregoing operation #1 to operation #6 is modified into a signature generation algorithm Sig and a signature verifying algorithm Ver illustrated in FIG. 9.

(Signature Generation Algorithm Sig)

First, the structure of the signature generation algorithm Sig will be described. The signature generation algorithm Sig includes the following processes (1) to (7).

Process (1): The signature generation algorithm Sig generates $a_i=(r_{0i}, t_{0i}, e_{0i}, r_{1i}, t_{1i}, e_{1i}, c_{0i}, c_{1i})$.

Process (2): The signature generation algorithm Sig calculates $Cmt \leftarrow H(c_{01}, c_{11}, \ldots, c_{0N}, c_{1n})$ Process (3): The signature generation algorithm Sig calculates $(Ch_{A1}, \ldots, Ch_{AN}) \leftarrow H(M, Cmt)$. Here, M is a document to which a signature is attached.

Process (4): The signature generation algorithm Sig generates $b_i=(t_{1i}, e_{1i})$ for i=1 to N. Further, the signature generation algorithm Sig calculates $d=H(t_{11}, e_{11}, \ldots, t_{1N}, e_{1N})$.

Process (5): The signature generation algorithm Sig calculates $(Ch_{B1}, \ldots, Ch_{BN}) \leftarrow H(M, Cmt, Ch_{A1}, \ldots, Ch_{AN}, d)$. Additionally, modification into $(Ch_{B1}, \ldots, Ch_{BN}) \leftarrow H(Ch_{A1}, \ldots, Ch_{AN}, d)$ may be performed.

Process (6): The signature generation algorithm Sig calculates $Rsp_i \leftarrow Select(Ch_{Bi}, a_i, b_i)$.

Process (7): The signature generation algorithm Sig sets $(Cmt, d, Rsp_1, \ldots, Rsp_N)$ as a digital signature.

(Signature Verifying Algorithm Ver)

Next, the structure of the signature verifying algorithm Ver will be described. The signature verifying algorithm Ver includes the following processes (1) to (4).

Process (1): The signature verifying algorithm Ver calculates $(Ch_{A1}, \ldots, Ch_{AN})=H(M, Cmt)$.

Process (2): The signature verifying algorithm Ver calculates $(Ch_{B1}, \ldots, Ch_{BN})=H(M, Cmt, Ch_{A1}, \ldots, Ch_{AN}, d)$. When modification into $(Ch_{B1}, \ldots, Ch_{BN})=H(Ch_{A1}, \ldots, Ch_{AN}, d)$ is performed in the process (5) performed by the signature verifying algorithm Ver, the signature verifying algorithm Ver calculates $(Ch_{B1}, \ldots, Ch_{BN})=H(Ch_{A1}, \ldots, Ch_{AN}, d)$.

Process (3): The signature verifying algorithm Ver generates $t_{11}, e_{11}, \ldots, t_{1N}, e_{1N}, c_{01}, c_{11}, \ldots, c_{0N}, c_{1N}$ using $Ch_{A1}, \ldots, Ch_{AN}, Ch_{B1}, \ldots, Ch_{BN}, Rsp_1, \ldots, Rsp_N$.

Process (4): The signature verifying algorithm Ver verifies $Cmt=H(c_{01}, c_{11}, \ldots, c_{0N}, c_{1N})$ using the reproduced $c_{01}, c_{11}, \ldots, c_{0N}, c_{1N}$, and $d=H(t_{11}, e_{11}, \ldots, t_{1N}, e_{1N})$.

As described above, by matching the prover in the model of the public-key authentication scheme with the signer in the digital signature scheme, the algorithm of the public-key authentication scheme can be modified into the algorithm of the digital signature scheme.

<5: Method of Reducing Memory Amount Necessary for Signature Verification>

Incidentally, in the above-described algorithm of the digital signature scheme, the signature verifying process has been executed after the signature verifying algorithm Ver receives all of the digital signatures. However, in the case of the above-described digital signature scheme, a data size of the digital signature is relatively large. For this reason, when authentication is executed using a device such as Radio Frequency IDentification (RFID), having only a small memory capacity, it is necessary to pay attention to a free capacity of a memory, a memory use ratio during an authentication process, or the like. Also, when a device having insufficient memory capacity is used, authentication is assumed not to be executed in some cases. Accordingly, the inventors of the present technology have devised a method of reducing a memory amount necessary for signature verification.

[5-1: Structure of Hash Function (FIG. 10)]

First, the inventors of the present technology focused on the structure of a hash function. In many cases, a hash function has a structure for grouping inputs in units of blocks and executing a process sequentially in the units of blocks. For example, in the case of SHA-1, the hash function has a structure illustrated in FIG. 10. The hash function illustrated in FIG. 10 generates a hash value by grouping padded inputs M into Z blocks $m_1, \ldots, m_Z$ and operating blocks $m_j$ to a predetermined function CF along with an initial value IV or an intermediate value $CV_j$ sequentially while increasing an index j. Thus, when the intermediate value $CV_j$ is obtained, the previously used blocks become unnecessary. Accordingly, based on the characteristics, a structure (hereinafter referred to as a memory reduction method) for efficiently reducing a memory amount necessary for executing an algorithm has been devised. A method of applying this structure to the above-described digital signature scheme will be described below.

[5-2: Example of Application to Digital Signature Scheme Based on 3-Pass Scheme (FIG. 12)]

First, a method of applying the foregoing memory reduction method to the algorithm of the digital signature scheme based on the 3-pass scheme illustrated in FIG. 8 will be described.

Figure 11:
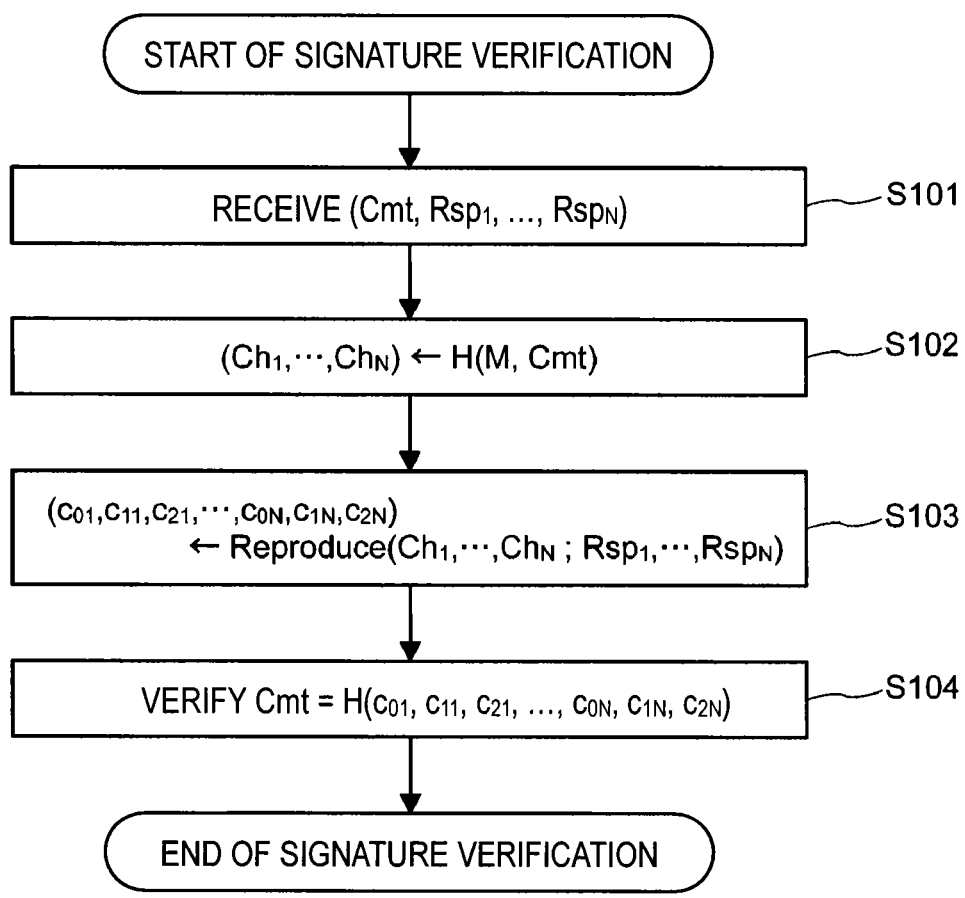
FIG. 11 is an explanatory diagram for describing a signature verification method (normal mounting method) related to the digital signature scheme based on the 3-pass scheme.

(Normal Mounting Method: FIG. 11)

Normally, as illustrated in FIG. 11, the signature verifying algorithm Ver related to the above-described digital signature scheme receives $(Cmt, Rsp_1, \ldots, Rsp_N)$ included in the digital signature at one time (S101). Subsequently, the signature verifying algorithm Ver executes $(Ch_1, \ldots, Ch_N) \leftarrow H(M, cmt)$ (S102). Subsequently, the signature verifying algorithm Ver executes $(c_{01}, c_{11}, c_{21}, \ldots, c_{0N}, c_{1N}, c_{2N}) \leftarrow$ Reproduce $(Ch_1, \ldots, Ch_N; Rsp_1, \ldots, Rsp_N)$ (S103). Subsequently, the signature verifying algorithm Ver verifies $Cmt=H(c_{01}, c_{11}, c_{21}, \ldots, c_{0N}, c_{1N}, c_{2N})$ (S104) and ends the series of processes related to signature verification.

Figure 12:
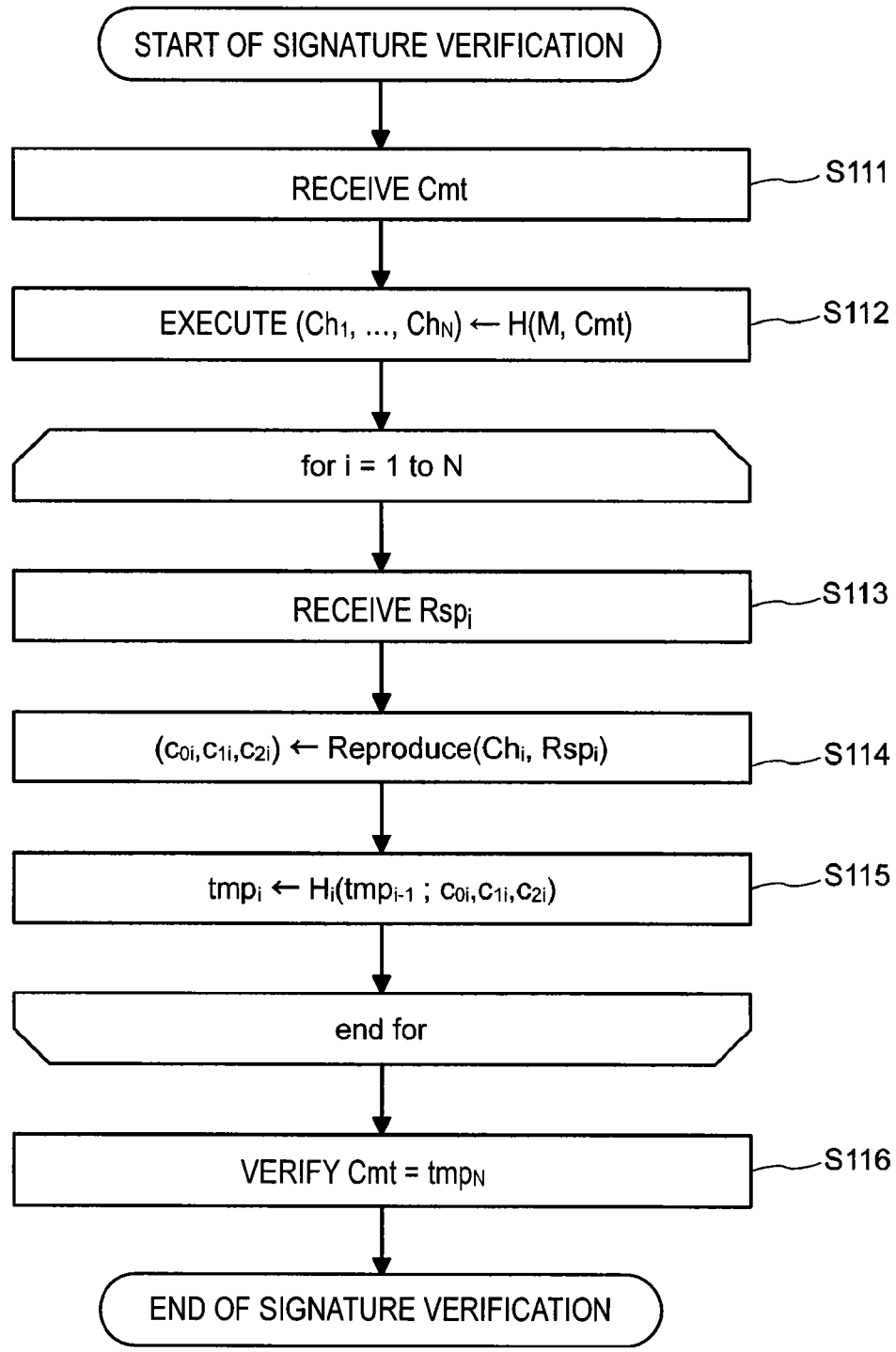
FIG. 12 is an explanatory diagram for describing a signature verification method (memory reduction method) related to the digital signature scheme based on the 3-pass scheme.

(Memory Reduction Method: FIG. 12)

In the case of the normal mounting method, when the digital signatures are received at one time as in step S101 of FIG. 11, a memory used to store $(Rsp_1, \ldots, Rsp_N)$ until completion of the process of step S103 is necessary. However, as understood from the algorithm structure of FIG. 5, no information is used except $(Ch_i; Rsp_i)$ in the reproduction of $(c_{0i}, c_{1i}, c_{2i})$ executed in step S103. Also, when the hash function structure illustrated in FIG. 10 is considered, the calculation of the hash function executed in step S104 is understood to be grouped and executed in the units of blocks. Accordingly, the structure related to the signature verification is improved to a structure illustrated in FIG. 12.

In the case of the structure illustrated in FIG. 12, the signature verifying algorithm Ver first receives only Cmt included in the digital signature (S111). Subsequently, the signature verifying algorithm Ver executes $(Ch_1, \ldots, Ch_N) \leftarrow H(M, cmt)$ (S112). Subsequently, the signature verifying algorithm Ver sequentially executes processes of steps S113 to S115 while increasing i for i=1 to N.

In step S113, the signature verifying algorithm Ver receives $Rsp_i$ (S113). Subsequently, the signature verifying algorithm Ver executes $(c_{0i}, c_{1i}, c_{2i}) \leftarrow$ Reproduce $(Ch_i; Rsp_i)$ using the received $Rsp_i$ (S114). After the process of step S114 is executed, $Ch_i$ and $Rsp_i$ become unnecessary. Accordingly, the signature verifying algorithm Ver erases $Ch_i$ and $Rsp_i$ from the memory after executing the process of step S114.

Subsequently, the signature verifying algorithm Ver executes $tmp_i \leftarrow H_i(tmp_{i-1}; c_{0i}, c_{1i}, c_{2i})$ (step S115). Also, the hash function $H_i$ is a function that outputs an intermediate value generated when up to $c_{0i}$, $c_{1i}$, $c_{2i}$ are calculated in the hash function H. In practice, since an input size of the function $H_i$ is different according to the selected function, suitable correction of an input length such as addition of bits is executed as necessary. When the function Hi is used, the hash function H is expressed as an algorithm including processes (1) to (3) to be described below. Then, $tmp_N$ is the final output (hash value) of the hash function H. In practice, an addition process of padding is executed in the final process according to the specification of the hash function.

> Process (1): $tmp_0$ <- null character string
> Process (2):
>   for i = 1 to N
>     $tmp_i$ <- $H_i$ ($tmp_{i-1}$; $c_{0i}$, $c_{1i}$, $c_{2i}$)
>   end for
> Process (3): output $tmp_N$ After executing the processes of steps S113 to S115 for i=1 to N, the signature verifying algorithm Ver verifies whether or not Cmt=$tmp_N$ holds (S116) and ends the series of processes related to the signature verification. As described above, the signature verifying algorithm Ver erases the information that becomes unnecessary during the repeated execution of the processes of steps S113 to S115 from the memory. For this reason, a memory amount necessary for the signature verification is suppressed to be as small as possible. Consequently, the foregoing signature verification can be executed even in a device having only a small memory capacity.

[5-3: Example of Application to Digital Signature Scheme Based on 5-Pass Scheme (FIG. 14)]

Next, a method of applying the foregoing memory reduction method to the algorithm of the digital signature scheme based on the 5-pass scheme illustrated in FIG. 9 will be described.

Figure 13:
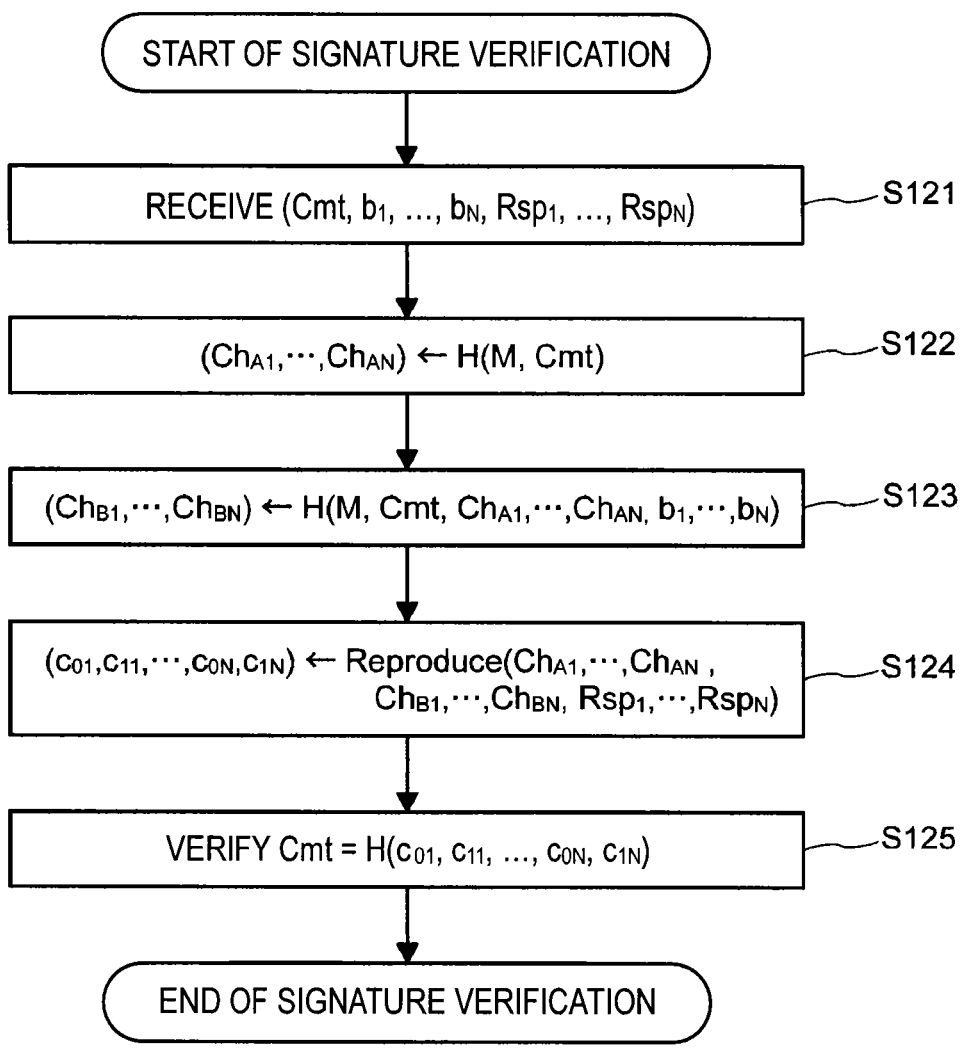
FIG. 13 is an explanatory diagram for describing a signature verification method (normal mounting method) related to the digital signature scheme based on the 5-pass scheme.

(Normal Mounting Method: FIG. 13)

Normally, as illustrated in FIG. 13, the signature verifying algorithm Ver related to the above-described digital signature scheme receives (Cmt, d, $Rsp_1$, . . . , $Rsp_N$) included in the digital signature at one time (S121). Subsequently, the signature verifying algorithm Ver executes ($Ch_{A1}$, . . . , $Ch_{AN}$)<-H (M, cmt) (S122). Subsequently, the signature verifying algorithm Ver executes ($Ch_{B1}$, . . . , $Ch_{BN}$)<-H(M, Cmt, $Ch_{A1}$, . . . , $Ch_{AN}$, d) (S123). Subsequently, the signature verifying algorithm Ver executes ($c_{01}$, $c_{11}$, . . . , $c_{0N}$, $c_{1N}$, $d_{11}$, $e_{11}$, . . . , $d_{1N}$, $e_{1N}$)<-Reproduce ($Ch_{A1}$, . . . , $Ch_{AN}$, $Ch_{B1}$, . . . , $Ch_{BN}$; $Rsp_1$, . . . , $Rsp_N$) (S124). Subsequently, the signature verifying algorithm Ver verifies Cmt=H($c_{01}$, $c_{11}$, . . . , $c_{0N}$, $c_{1N}$) and d=H($d_{11}$, $e_{11}$, . . . , $d_{1N}$, $e_{1N}$) (S125) and ends the series of processes related to signature verification.

Figure 14:
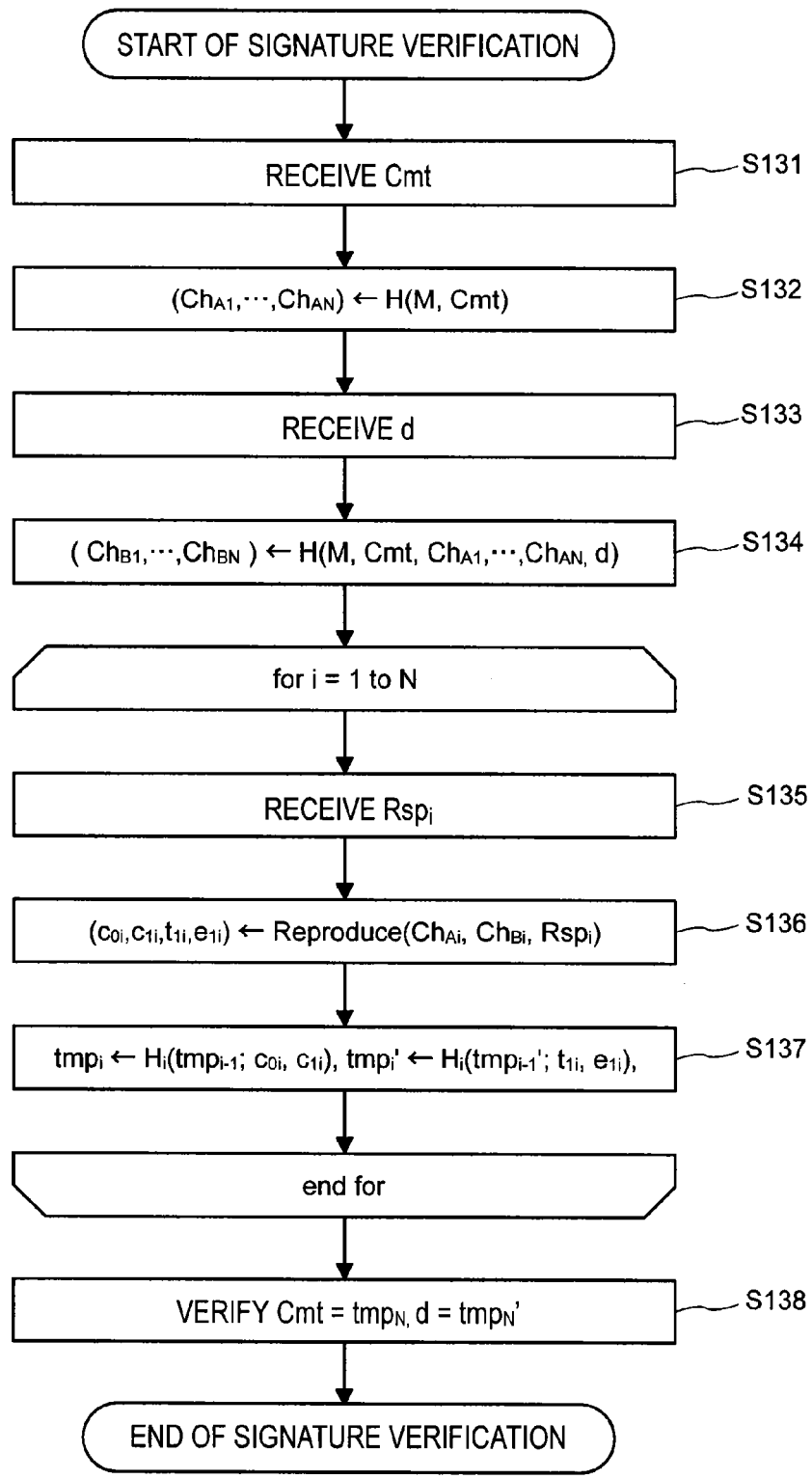
FIG. 14 is an explanatory diagram for describing a signature verification method (memory reduction method) related to the digital signature scheme based on the 5-pass scheme.

(Memory Reduction Method: FIG. 14)

When the digital signatures are received at one time as in step S121 of FIG. 13, a memory used to store ($Rsp_1$, . . . , $Rsp_N$) until completion of the process of step S124 is necessary. However, as understood from the algorithm structure of FIG. 7, no information is used except ($Ch_{Ai}$, $Ch_{Bi}$; $Rsp_i$) in the reproduction of ($c_{0i}$, $c_{1i}$, $d_{1i}$, $e_{1i}$) executed in step S124. Also, when the hash function structure illustrated in FIG. 10 is considered, the calculation of the hash function executed in step S125 is understood to be grouped and executed in the units of blocks. Accordingly, the structure related to the signature verification is improved to a structure illustrated in FIG. 14.

In the case of the structure illustrated in FIG. 14, the signature verifying algorithm Ver first receives only Cmt included in the digital signature (S131). Subsequently, the signature verifying algorithm Ver executes ($Ch_{A1}$, . . . , $Ch_{AN}$)<-H(M, cmt) (S132).

Subsequently, the signature verifying algorithm Ver receives d (S133). Subsequently, the signature verifying algorithm Ver executes ($Ch_{B1}$, . . . , $Ch_{BN}$)<-H(M, Cmt, $Ch_{A1}$, . . . , $Ch_{AN}$, d) using the received d (S134). After the process of step S134 is executed, d becomes unnecessary. Accordingly, the signature verifying algorithm Ver erases d from the memory after executing the process of step S134. Subsequently, the signature verifying algorithm Ver sequentially executes processes of steps S135 to S137 while increasing i for i=1 to N.

In step S135, the signature verifying algorithm Ver receives $Rsp_i$ (S135). Subsequently, the signature verifying algorithm Ver executes ($c_{0i}$, $c_{1i}$, $t_{1i}$, $e_{1i}$)<-Reproduce ($Ch_{Ai}$, $Ch_{Bi}$; $Rsp_i$) using the received $Rsp_i$ (S136). After the process of step S136 is executed, $Ch_{Ai}$, $Ch_{Bi}$, and $Rsp_i$ become unnecessary. Accordingly, the signature verifying algorithm Ver erases $Ch_{Ai}$, $Ch_{Bi}$, and $Rsp_i$ from the memory after executing the process of step S136.

Subsequently, the signature verifying algorithm Ver executes $tmp_i$<-$H_i$($tmp_{i-1}$; $c_{0i}$, $c_{1i}$) and $tmp_i$'<-$H_i$ ($tmp_{i-1}$'; $t_{1i}$, $e_{1i}$) (step S137). After executing the processes of steps S135 to S137 for i=1 to N, the signature verifying algorithm Ver verifies whether or not Cmt=$tmp_N$ and d=$tmp_N$' hold (S138) and ends the series of processes related to the signature verification. As described above, the signature verifying algorithm Ver erases the information that becomes unnecessary during the repeated execution of the processes of steps S135 to S137 from the memory. For this reason, a memory amount necessary for the signature verification is suppressed to be as small as possible. Consequently, the foregoing signature verification can be executed even in a device having only a small memory capacity.

The methods of reducing a memory amount necessary for the signature verification have been described above.

<6: Method of Extracting Ternary Random Number Sequence from Binary Random Number Sequence>

Incidentally, there is a situation in which N or more ternary uniform random numbers are generated in the algorithm of the public-key authentication scheme based on the 3-pass scheme. However, an excellent random number generator generating ternary uniform random numbers is not typical. For this reason, it is necessary to consider a method of generating ternary uniform random numbers using an excellent random number generator that generates binary uniform random numbers. Accordingly, the inventors of the present technology have devised methods of efficiently generating ternary uniform random numbers from binary uniform random numbers. Hereinafter, these methods will be described in detail. In the following description, one number expressed in base 1 (where 1 is 2 or 3) is assumed to be counted as 1 symbol.

[6-1: Extraction Method #1 (2-Bit Grouping) (FIG. 15)]

First, a method (hereinafter referred to as extraction method #1) of grouping binary numbers of M bits by two bits each and extracting ternary numbers will be introduced with reference to FIG. 15. As illustrated in FIG. 15, when a random number string in binary representation is grouped by two bits each, M/2 2-bit random numbers can be obtained. For example, when "00" is matched with the ternary numeral "0," "01" is matched with the ternary numeral "1," and "10" is matched with the ternary numeral "2," ternary random number strings can be obtained from the random number of the binary representation in the units of 2 bits. However, the 2-bit value "11" is excluded. That is, extraction method #1 is a method of extracting $3^1$ numbers expressed by 1 ternary symbol from $2^2$ numbers expressed by 2 binary symbols. Thus, a probability $P_1$ of N or more ternary numerals not being extractable is expressed as in the following formula (13).

[Math 11]

$$P_1 = \sum_{M/2-N<i\leq M/2} {}_{M/2}C_i(1/4)^i(3/4)^{M/2-i} \quad (13)$$

[6-2: Extraction Method #2 (No Grouping) (FIG. 16)]

Next, a method (hereinafter referred to as extraction method #2) of extracting random numbers of L ternary symbols using random numbers of M binary symbols without grouping will be introduced with reference to FIG. 16. Here, L is the maximum integer satisfying $3^L \leq 2^M$. There is a number $2^M$ expressible by the M binary symbols. On the other hand, there is only a number $3^L$ expressible by L ternary symbols. For this reason, of $2^M$ expressed by the M binary symbols, $2^M-3^L$ are not used as the random numbers of the ternary representation. Thus, a probability $P_2$ of N or more ternary numerals not being extractable is expressed as in the following formula (14).

[Math 12]

$$P_2 = 1-3^L/2^M \quad (14)$$

[6-3: Extraction Method #3 (k-Bit Grouping) (FIG. 17)]

Figures 17, 18:
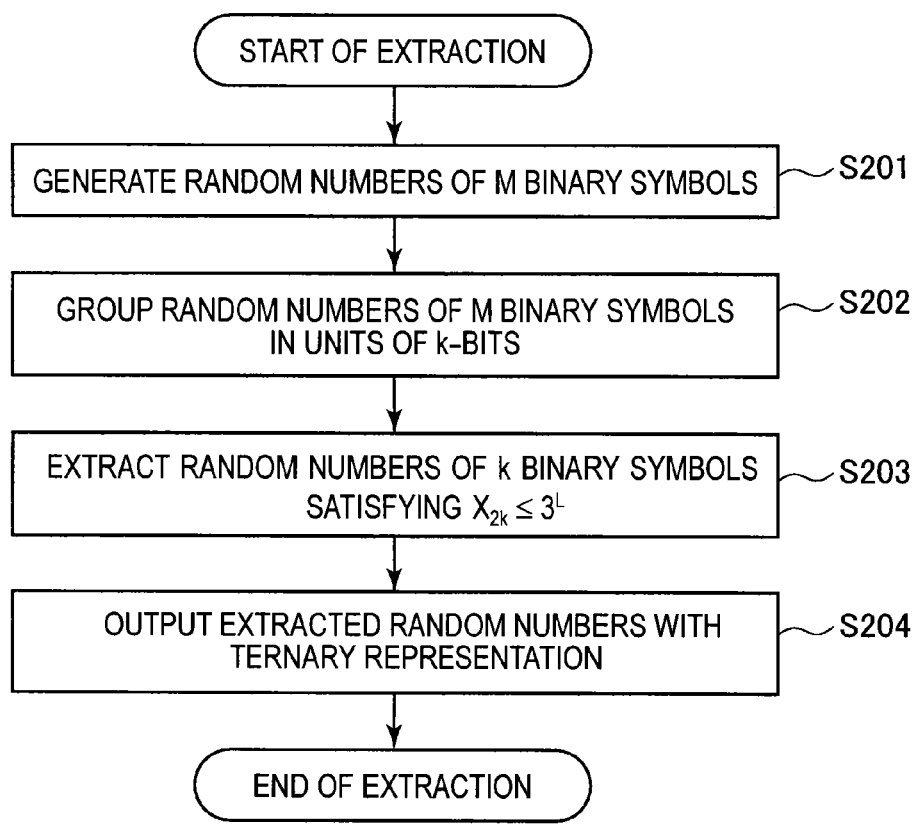
FIG. 17 is an explanatory diagram for describing a method (extraction method #3) of extracting ternary random numbers from binary random numbers.
FIG. 18 is an explanatory diagram for describing a method (extraction method #3) of extracting ternary random numbers from binary random numbers.

The foregoing extraction method #1 is a method of grouping a random number string of the binary representation in the minimum grouping unit. On the other hand, the foregoing extraction method #2 is a method of grouping a random number string of the binary representation in the maximum grouping unit (since M-bit grouping is considered). As understood from the foregoing formulas (13) and (14), a probability that N or more ternary numerals may not be extracted is different according to the grouping length. Additionally, when a random number string of M binary symbols is grouped in units of k bits, as illustrated in FIG. 17, a probability $P_3$ of N or more ternary numerals not being extractable is expressed as in the following formula (15).

[Math 13]

$$P_3 = \sum_{M/k-N/L<i\leq M/k} {}_{M/k}C_i(1-3^L/2^k)^i(3^L/2^k)^{M/k-i} \quad (15)$$

When the probability $P_3$ of N or more ternary numerals not being extractable can be minimized, a random number string of the ternary representation can be extracted most efficiently. For example, when M=512 and N=140, the probability $P_3$ is minimized when k=8.

(6-3-1: Basic Structure (FIG. 18))

Here, the flow of a process of extracting a random number string of L ternary symbols from a random number string of M binary symbols will be described with reference to FIG. 18. As illustrated in FIG. 18, a random number string of M binary symbols is first generated (S201). Subsequently, the random number string of the M binary symbols is grouped in units of k bits (S202). Subsequently, a bit string satisfying $X_{2k} \leq 3^L$ is extracted from the bit strings $X_{2k}$ grouped in the units of k bits (S203). Subsequently, the extracted bit string is output with ternary representation (S204) and the series of processes ends.

(6-3-2: Additional Extraction Method (FIG. 19))

By calculating the length k of the grouping by which the probability $P_3$ expressed in the foregoing formula (15) is the minimum and executing the algorithm illustrated in FIG. 18, it is possible to efficiently extract a random number string of the ternary representation from a random number string of the binary representation. However, the inventors of the present technology have devised a method of extracting a random number string of the ternary representation more efficiently by focusing on the fact that a bit string satisfying $X_{2k} > 3^L$ is not used in step S204 of FIG. 18. This method will be described below with reference to FIG. 19.

Figure 19:
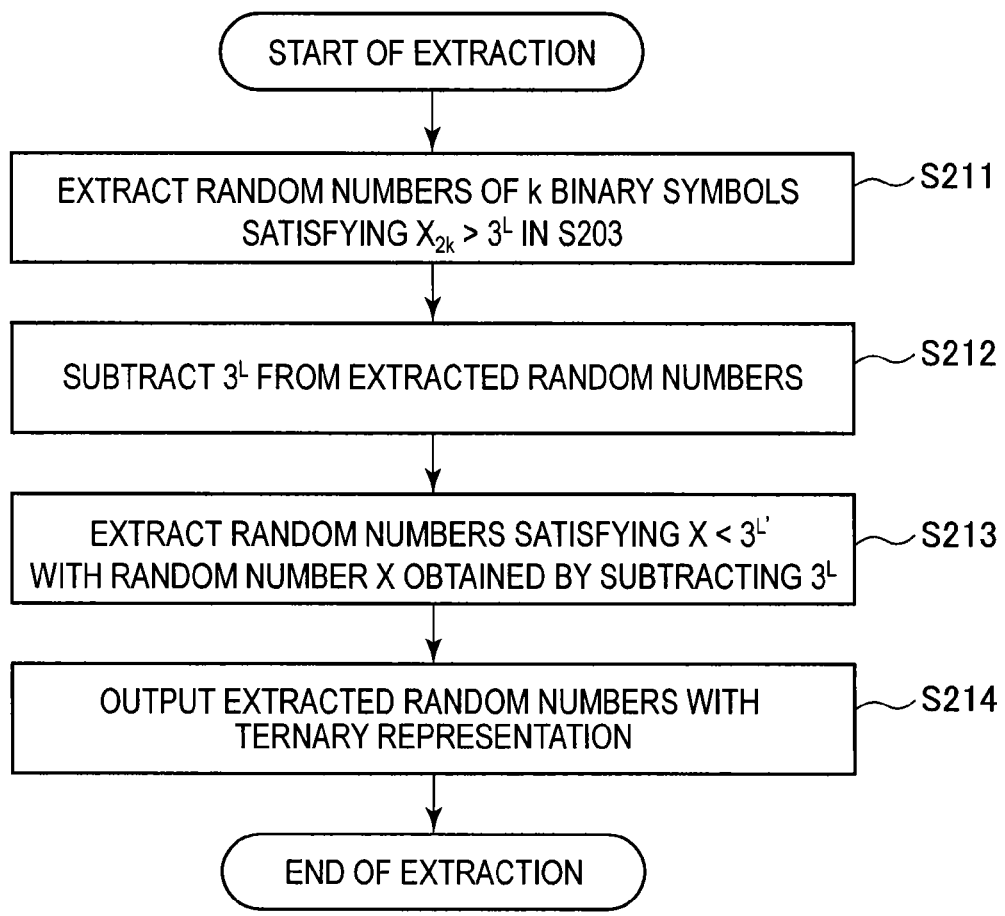
FIG. 19 is an explanatory diagram for describing a method (extraction method #3) of extracting ternary random numbers from binary random numbers.

This method is a method of extracting a symbol string of the ternary representation using bit strings not extracted in step S204 of FIG. 18. As illustrated in FIG. 19, a set of bit strings that are not extracted in step S204 of FIG. 18 and satisfy $X_{2k} > 3^L$ (for example, when a set of bit strings is expressed as $y_1 y_2 \ldots y_N$, an individual bit string $y_i$ satisfies $3^L \leq y_i < 2^k$) is first extracted (S211). Subsequently, $3^L$ is subtracted from each extracted bit string y, and a set of new bits strings (for example, when a set of new bit strings is expressed as $z_1 z_2 \ldots z_N$, an individual bit string $z_i = y_i - 3^L$ satisfies $0 \leq z_i < 2^k - 3^L$) is calculated (S212).

Subsequently, a bit string X satisfying $X < 3^{L'}$ is extracted from the set of new bit strings (S213). Here, L' is the maximum integer satisfying $3^{L'} \leq 2^k - 3^L$. Subsequently, the bit string extracted in step S213 is output with the ternary representation (S214) and the series of processes ends. By applying this algorithm, L' ternary numerals can be newly extracted at a probability $3^{L'}/(2^k - 3^L)$. Also, by recursively using this method, more ternary numerals can be extracted. That is, ternary numerals can be extracted similarly from the bit strings satisfying $X \geq 3^{L'}$ in step S213.

The method of efficiently generating ternary uniform random numbers from binary uniform random numbers has been described above.

<7: Method of Efficiently Substituting Coefficients of Multivariate Polynomials>

However, a method of sharing the multivariate polynomials between a prover (or a signer) and a verifier has not been specifically described above. A conceivable method of sharing the multivariate polynomials includes a method of sharing a seed used at the time of generation of coefficients (random numbers) of the multivariate polynomials between the prover and the verifier. However, the multivariate polynomials may not be shared as long as a sequence by which random numbers generated using the shared seed are applied to the coefficients is not shared between the prover and the verifier.

[7-1: Basic Determination]

Accordingly, basic determination is executed with regard to a sequence by which a random number string generated using a seed shared between a prover (or a signer) and a verifier is applied to the multivariate polynomials. Then, when the multivariate polynomials are used, a random number string is applied to the multivariate polynomials according to this basic determination. When this method is used, the multivariate polynomials are shared between a prover (or a signer) and a verifier.

[7-2: Structuring of Data]

However, a number of coefficients of the multivariate polynomials is considerable. When one coefficient is expressed in units of 1 bit, data of at least several tens of thousands of bits is necessary to express a multivariate polynomial. For this reason, the load of a process of substituting numbers for the coefficients of a multivariate polynomial is very high. Accordingly, the inventors of the present technology have devised techniques (structuring techniques #1 and #2) for realizing efficiency of the process of substituting numbers for coefficients by structuring the coefficients of a multivariate polynomial in predetermined units. Also, the inventors of the present technology have devised a technique (structuring technique #3) for improving the processing efficiency when a substitution process is executed a plurality of times on the coefficients of the same multivariate polynomial. These techniques will be described in detail below.

(7-2-1: Structuring Technique #1 (FIG. 20))

Figure 20:
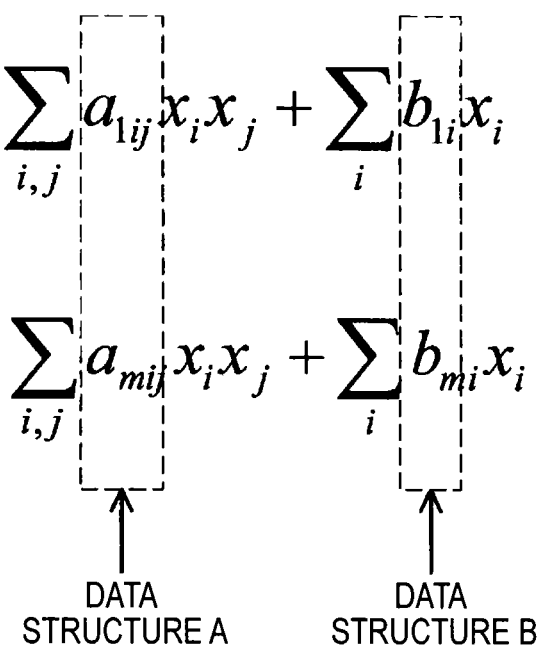
FIG. 20 is an explanatory diagram for describing a data structuring technique (structuring technique #1) for efficiently substituting coefficients of a multivariate polynomial.

First, structuring technique #1 will be described. As illustrated in FIG. 20, structuring technique #1 is a technique for collecting coefficients of the same kind of terms included in a multivariate polynomial as one data structure. In the example of FIG. 20, coefficients $a_{1J}$ to $a_{MJ}$ are collected as data structure A and coefficients $b_{1I}$ to $b_{MI}$ are collected as data structure B.

When structuring technique #1 is not applied, substitution of coefficients for the m n-variable polynomials is executed by the following algorithm (example 1). In the case of (example 1), it is necessary to execute a 1-bit AND operation (&) $2 \times N \times (N-1) \times M/2$ times. Also, it is necessary to execute a 1-bit XOR operation (^) $N \times (N-1) \times M/2$ times.

Example 1

```
for L = 1 to M
    for I = 1 to N
        for J = I to N
            [L^th bit of f] ^= [a_{LIJ}] & [I^th bit of x] & [J^th bit of x];
        end for
    end for
end for
output f;
```

On the other hand, as illustrated in FIG. 20, when the coefficients are structured and generated random numbers are applied sequentially some at a time as the coefficients of the multivariate polynomial, a coefficient substitution algorithm is expressed as in (example 2). In the case of (example 2), an L-bit AND operation (&) is executed merely $2 \times N \times (N-1)/2$ times and an M-bit XOR operation (^) is executed merely $N \times (N-1)/2$ times. Also, $a_{IJ(1\ to\ M)}$ are generated at a timing of each loop. The coefficients may be used in reverse. For example, when a loop is executed $N(N-1)/2$ times, $[a_{IJ(1\ to\ M)}]$ may not be generated every time, but may be generated only once every M times. Also, during a loop of L times, $[a_{IJ(1\ to\ M)}]$ may be used whiling rotating them bit by bit.

Example 2

```
for I = 1 to N
    for J = I to N
        [1^st to M^th bits of f] ^= [a_{IJ(1\ to\ M)}] & [I^th bit of x] & [J^th bit of x];
    end for
end for
output f;
```

As illustrated in FIG. 20, the coefficients may be structured and an intermediate result obtained by applying the coefficients of the multivariate polynomial may be stored in a table. In this case, the coefficient substitution algorithm is expressed as in (example 3). Also, $a_{IJ}[x_1, \ldots, x_k][z_1, \ldots, z_k] = (a_{(k(I-1)+1)(k(J-1)+1)} \& x_1 \& z_1)^{\wedge} \ldots ^{\wedge} (a_{(k(I-1)+1)(k(J-1)+k)} \& x_1 \& z_k)^{\wedge} \ldots ^{\wedge} (a_{(k(I-1)+k)(k(J-1)+1)} \& x_k \& z_1)^{\wedge} \ldots ^{\wedge} (a_{(k(I-1)+k)(k(J-1)+k)} \& x_k \& z_k)$ are stored in arrays $a_{IJ}[0][0]$ to $a_{IJ}[2^k-1][2^k-1]$, respectively. In the case of example 3, an L-bit XOR operation (^) is executed merely $(N/k)(N/k-1)/2$ times. However, a necessary memory amount is $2^{2k}/k^2$ times the memory amount of the algorithm of (example 2).

For example, when k=1, the L-bit XOR operation is executed $120*119/2=7140$ times, a necessary memory amount is $2^2=4$ times the memory amount of (example 2), and the number of loops is not changed. Also, when k=2, the L-bit XOR operation is executed $60*59/2=1770$ times, a necessary memory amount is $2^4/4=4$ times, and the number of loops is 1/4. When k=4, the L-bit XOR operation is executed $30*29/2=435$ times, a necessary memory amount is $2^8/4^2=16$ times, and the number of loops is 1/16.4. When k=6, the L-bit XOR operation is executed $20*19/2=190$ times, a necessary memory amount is $2^{12}/6^2=114$ times, and the number of loops is 1/37.6. When k=8, the L-bit XOR operation is executed $15*14/2=135$ times, a necessary memory amount is $2^{16}/8^2=1024$ times, and the number of loops is 1/52.9.

Example 3

```
for I = 1 to N/k
    for J = I to N/k
        [1^st to M^th bit of f] ^= [a_{IJ(1\ to\ M)}] [k(I-1) + 1^th to k^th bits of x] [k(J-1) + 1^th to k^th bits of x];
    end for
end for
output f;
```

The coefficient substitution algorithm according to the structuring technique #1 has been described above. In the structure, a process can be expected to be executed at a high speed when the algorithm is executed.

(7-2-2: Structuring Technique #2 (FIG. 21))

Figure 21:
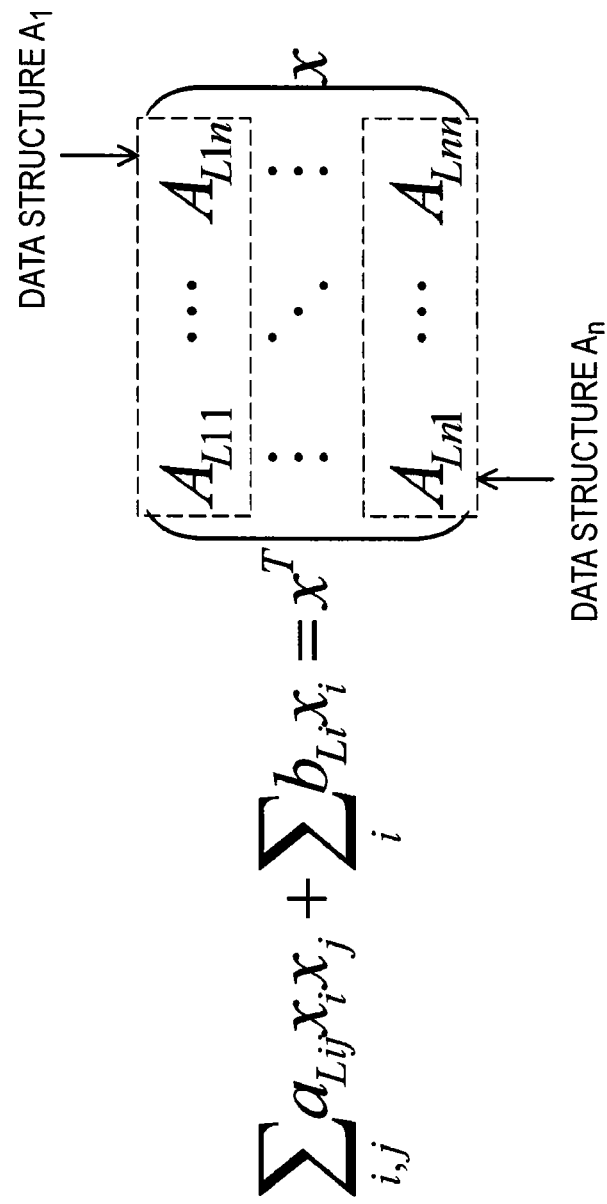
FIG. 21 is an explanatory diagram for describing a data structuring technique (structuring technique #2) for efficiently substituting coefficients of a multivariate polynomial.

Next, structuring technique #2 will be described. As illustrated in FIG. 21, structuring technique #2 is a technique for expressing a multivariate polynomial in a quadratic form and collecting the rows and the columns of the quadratic form as one data structure. In the example of FIG. 21, the data structure is collected in the row direction.

As illustrated in FIG. 21, when the coefficients are structured and the generated random numbers are applied sequentially some at a time as the coefficients of a multivariate polynomial, a coefficient substitution algorithm is expressed as in (example 4). In the case of example 4, an N-bit AND operation (&) is executed merely $(N+1) \times M$ times, an N-bit XOR operation (^) is executed merely $N \times M$ times, and an operation of a function Q is performed merely M times.

Example 4

```
for I = 1 to N
    T ^= A_I & [I^th bit of x]
end for
T & = x;
output Q(T);
Q(z) {
    z = z ^ (z >> 1);
    z = z ^ (z >> 2);
    z = z ^ (z >> 4);
    z = z ^ (z >> 8);
    ...
    Z = z ^ (z >> 2^{Log(N)});
```

```
        return z & 1;
    }
```

As illustrated in FIG. 21, when the coefficients are structured, an intermediate result obtained by applying the coefficients of the multivariate polynomial may be stored in a table. In this case, the coefficient substitution algorithm is expressed as in (example 5). Also, $A_I[x_1, \ldots, x_k]=(A_{(k(I-1)+1)}$ & $x_1)\char`^ \ldots \char`^(A_{(k(I-1)+k)}$ & $x_k)$ are stored in $A_I[0]$ to $A_I[2^k-1]$, respectively. In the case of example 5, an N-bit XOR operation (^) is executed merely (N/k)×M times and an N-bit operation of the function Q is executed merely M times. However, a necessary memory amount is $2^k/k$ times the memory amount of (example 4).

For example, when k=1, the N-bit XOR operation is executed 120 times, a necessary memory amount is twice the memory amount of (example 4), and the number of loops is not changed. Also, when k=4, the N-bit XOR operation is executed 30 times, a necessary memory amount is $2^4/4=4$ times, and the number of loops is ¼. When k=8, the N-bit XOR operation is executed 15 times, a necessary memory amount is $2^8/8=32$ times, and the number of loops is ⅛. When k=16, the N-bit XOR operation is executed 8 times, a necessary memory amount is $2^{16}/16=4096$ times, and the number of loops is 1/15.

Example 5

```
for I = 1 to N/k
    T ^ = A_I [k(I − 1) +1^{th} to k(I − 1) + k^{th} bits of x]
end for
T & = x;
output Q(T);
```

The specific coefficient substitution algorithms related to structuring technique #2 have been described. In the structure, a process can be expected to be executed at a high speed when the algorithm is executed.

(7-2-3: Structuring Technique #3)

Next, structuring technique #3 will be described. Structuring technique #3 is a technique for sequentially executing a process N times (where N≥2) in parallel by setting a portion "for generating some of the coefficients and executing a substitution process on some of the coefficients N times" in units, rather than generating a polynomial from random numbers N times and executing a substitution process, when the substitution process is executed on the same multivariate polynomial N times. When this technique is applied, a throughput is improved in all of the processes of N times in a case in which a cost of random number generation is not negligible.

For example, in the algorithm illustrated in FIG. 5, the calculation of the multivariate polynomials F and G is executed N times repeatedly while factors in operation #1 are updated. Accordingly, in such a calculation portion, computation is configured to be executed repeatedly using the same coefficients. When the multivariate polynomial $F(r_{0i})$ (where i=1 to N) is calculated using the algorithm of the foregoing (example 2), all of the N $r_{0i}$ are configured to be applied to once generated $[a_{IJL}]$, and then a process related to a subsequent $[a_{IJL}]$ is configured to be executed. In this configuration, the same coefficient $[a_{IJL}]$ is not generated N times in the end.

The specific coefficient substitution algorithm related to structuring technique #3 has been described above. In the configuration, a throughput is improved in a total of the processes performed N times.

<8: Example of Hardware Configuration (FIG. 22)>

Figure 22:
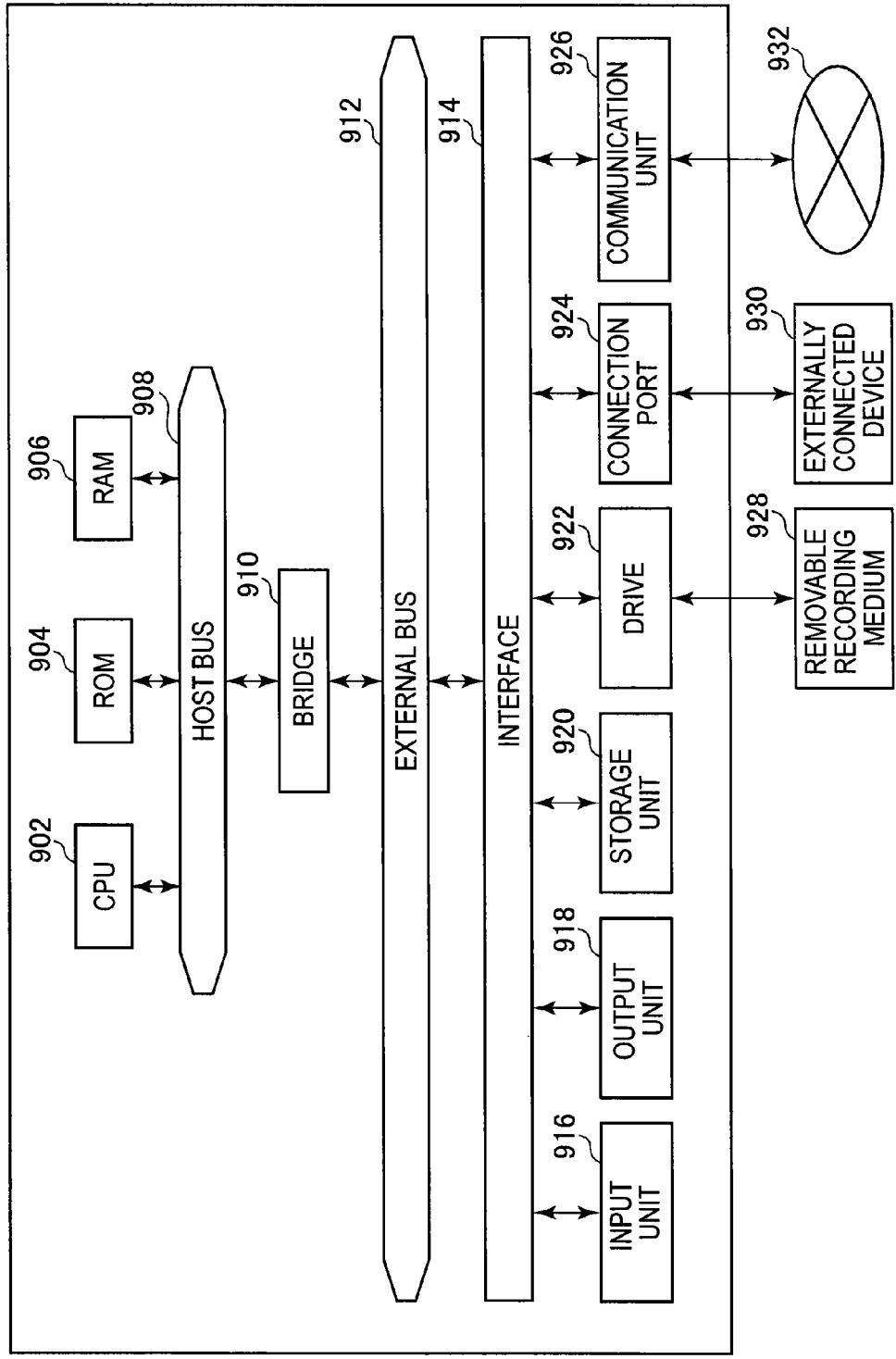
FIG. 22 is an explanatory diagram for describing a hardware configuration example of an information processing apparatus capable of executing the algorithm according to each embodiment of the present technology.

Each algorithm described above can be performed by using, for example, the hardware configuration of the information processing apparatus shown in FIG. 22. That is, processing of each algorithm can be realized by controlling the hardware shown in FIG. 22 using a computer program. Additionally, the mode of this hardware is arbitrary, and may be a personal computer, a mobile information terminal such as a mobile phone, a PHS or a PDA, a game machine, a contact or non-contact IC chip, a contact or non-contact IC card, or various types of information appliances. Moreover, the PHS is an abbreviation for Personal Handy-phone System. Also, the PDA is an abbreviation for Personal Digital Assistant.

As shown in FIG. 22, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removable recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removable recording medium 928 such as a magnetic disk, an optical disk, a magneto-optical disk, or a semiconductor memory, or writes information in the removable recording medium 928. The removable recording medium 928 is, for example, a DVD medium, a Blu-ray medium, an HD-DVD medium, various types of semiconductor storage media, or the like. Of course, the removable recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a device for contact or non-contact communication. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

<9: Summary>

Lastly, the technical contents according to the embodiment of the present technology will be briefly described. The technical contents stated here can be applied to various information processing apparatuses, such as a personal computer, a mobile phone, a game machine, an information terminal, an information appliance, a car navigation system, and the like. Further, the function of the information processing apparatus described below can be realized by using a single information processing apparatus or using a plurality of information processing apparatuses. Furthermore, a data storage means and an arithmetic processing means which are used for performing a process by the information processing apparatus described below may be mounted on the information processing apparatus, or may be mounted on a device connected via a network.

The functional configuration of the foregoing information processing apparatus is realized as follows. For example, an information processing apparatus described in the following (1) has a function of executing an algorithm related to an efficient public-key authentication scheme or a digital signature scheme that bases its safety on the difficulty of solving multi-order multivariate simultaneous equations.

(1)

A signature verification apparatus including:

a signature acquisition unit configured to acquire a digital signature including first information generated based on a pair of multi-order multivariate polynomials $F=(f_1, \ldots, f_m)$ defined in a ring K, a signature key s which is an element of a set $K^n$, and a document M and a plurality of pieces of second information necessary for verifying that the first information is generated using the signature key based on the document M, the pair of multi-order multivariate polynomials F, and vectors $y=(f_1(s), \ldots, f_m(s))$; and a signature verification unit configured to verify legitimacy of the document M by confirming whether or not the first information is restorable using the plurality of pieces of second information included in the digital signature, wherein the pair of multivariate polynomials F and the vectors y are public keys, wherein the signature acquisition unit acquires a predetermined number of the pieces of second information, and wherein the signature verification unit restores the first information sequentially using the acquired predetermined number of pieces of second information and erases the second information unnecessary in a restoring process in an unnecessary stage at which the second information becomes unnecessary.

(2)

The signature verification apparatus according to (1), wherein the first information is generated using a unidirectional function of processing information to be input by grouping the information to be input in units of blocks, and wherein the signature verification unit restores the first information by repeatedly executing a process of generating an intermediate value output by the unidirectional function in a process in the units of blocks based on the acquired predetermined number of pieces of second information and a process of generating a subsequent intermediate value based on the generated intermediate value and the predetermined number of pieces of the subsequently acquired second information.

(3)

The signature verification apparatus according to (2), wherein the predetermined number of pieces of second information are erased in a stage at which generation of the intermediate value is completed.

(4)

The signature verification apparatus according to (2) or (3), wherein the predetermined number is 1, and wherein a size of information included in the second information and used in generation of the intermediate value from the unidirectional function is equal to or greater than a data size of the units of blocks.

(5)

A signature verification method including:

a step of acquiring a digital signature including first information generated based on a pair of multi-order multivariate polynomials $F=(f_1, \ldots, f_m)$ defined in a ring K, a signature key s which is an element of a set $K^n$, and a document M and a plurality of pieces of second information necessary for verifying that the first information is generated using the signature key s based on the document M, the pair of multi-order multivariate polynomials F, and vectors $y=(f_1(s), \ldots, f_m(s))$; and a step of verifying legitimacy of the document M by confirming whether or not the first information is restorable using the plurality of pieces of second information included in the digital signature, wherein the pair of multivariate polynomials F and the vectors y are public keys, wherein, in the step of acquiring the digital signature, a predetermined number of the pieces of second information are acquired, and wherein, in the step of verifying the legitimacy, the first information is restored sequentially using the acquired predetermined number of pieces of second information and the second information unnecessary in a restoring process is erased in an unnecessary stage at which the second information becomes unnecessary.

(6)

A program causing a computer to realize:

a signature acquisition function of acquiring a digital signature including first information generated based on a pair of multi-order multivariate polynomials $F=(f_1, \ldots, f_m)$ defined in a ring K, a signature key s which is an element of a set $K^n$, and a document M and a plurality of pieces of second information necessary for verifying that the first information is generated using the signature key s based on the document M, the pair of multi-order multivariate polynomials F, and vectors $y=(f_1(s), \ldots, f_m(s))$; and a signature verification function of verifying legitimacy of the document M by confirming whether or not the first information is restorable using the plurality of pieces of second information included in the digital signature, wherein the pair of multivariate polynomials F and the vectors y are public keys, wherein the signature acquisition function acquires a predetermined number of the pieces of second information, and wherein the signature verification function restores the first information sequentially using the acquired predetermined number of pieces of second information and erases the second information unnecessary in a restoring process in an unnecessary stage at which the second information becomes unnecessary.

(7)

A computer-readable recording medium having a program recorded thereon, the program causing a computer to realize:

a signature acquisition function of acquiring a digital signature including first information generated based on a pair of multi-order multivariate polynomials $F=(f_1, \ldots, f_m)$ defined in a ring K, a signature key s which is an element of a set $K^n$, and a document M and a plurality of pieces of second information necessary for verifying that the first information is generated using the signature key s based on the document M, the pair of multi-order multivariate polynomials F, and vectors $y=(f_1(s), \ldots, f_m(s))$; and a signature verification function of verifying legitimacy of the document M by confirming whether or not the first information is restorable using the plurality of pieces of second information included in the digital signature, wherein the pair of multivariate polynomials F and the vectors y are public keys, wherein the signature acquisition function acquires a predetermined number of the pieces of second information, and wherein the signature verification function restores the first information sequentially using the acquired predetermined number of pieces of second information and erases the second information unnecessary in a restoring process in an unnecessary stage at which the second information becomes unnecessary.

(Remark)

The above-mentioned signature verifying algorithm Ver is an example of the signature acquisition unit and the signature verification unit.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

In the above description, the algorithms using the hash function H have been introduced, but a commitment function COM may be used instead of the hash function H. The commitment function COM is a function in which a character string S and a random number ρ are used as factors. An example of the commitment function includes a scheme presented by Shai Halevi and Silvio Micali at the international conference CRYPTO1996.

REFERENCE SIGNS LIST

Gen key generation algorithm
P prover algorithm
V verifier algorithm
Sig signature generation algorithm
Ver signature verifying algorithm

The invention claimed is:

1. A signature verification apparatus comprising:
a signature acquisition unit configured to acquire and store in a memory a digital signature including:
a first information generated based on a pair of multi-order multivariate polynomials $F=(f_1, \ldots, f_m)$ defined in a ring K and a signature key s which is an element of a set $K^n$, and
a plurality of pieces of a second information for verifying that the first information is generated using the signature key s based on data M to which the digital signature is attached, the pair of multi-order multivariate polynomials F, and vectors $y=(f_1(s), \ldots, f_m(s))$; and
a signature verification unit configured to verify legitimacy of the data M by confirming whether or not the first information is restorable using the plurality of pieces of the second information included in the digital signature,
wherein the pair of multivariate polynomials F and the vectors y are public keys,
wherein the signature acquisition unit acquires and stores a predetermined number of pieces among the plurality of pieces of the second information, and
wherein, in a restoring process, the signature verification unit restores the first information sequentially using the acquired predetermined number of pieces of the second information and erases the predetermined number of pieces of the second information unnecessary from the memory.

2. The signature verification apparatus according to claim 1,
wherein the first information is generated using a unidirectional function of processing information to be input by grouping the information to be input in units of blocks, and
wherein the signature verification unit restores the first information by repeatedly executing a process of generating an intermediate value output by the unidirectional function in the process in the units of blocks based on the acquired predetermined number of pieces of the second information and a process of generating a subsequent intermediate value based on the generated intermediate value and the predetermined number of pieces of the subsequently acquired second information.

3. The signature verification apparatus according to claim 2, wherein the predetermined number of pieces of the second information are erased in a stage at which generation of the intermediate value is completed.

4. The signature verification apparatus according to claim 2,
wherein the predetermined number of pieces of the second information stored in the memory is one, and
wherein a size of information included in the second information and used in generation of the intermediate value from the unidirectional function is equal to or greater than a data size of the units of blocks.

5. A signature verification method comprising:
acquiring and storing in a memory a digital signature including:
a first information generated based on a pair of multi-order multivariate polynomials $F=(f_1, \ldots, f_m)$ defined in a ring K and a signature key s which is an element of a set $K^n$, and a plurality of pieces of a second information for verifying that the first information is generated using the signature key s based on data M to which the digital signature is attached, the pair of multi-order multivariate polynomials F, and vectors $y=(f_1(s), \ldots, f_m(s))$; and verifying legitimacy of the data M by confirming whether or not the first information is restorable using the plurality of pieces of the second information included in the digital signature, wherein the pair of multivariate polynomials F and the vectors y are public keys, wherein a predetermined number of pieces among the plurality of pieces of the second information are acquired and stored in the memory, and wherein in a restoring process, the first information is restored sequentially using the acquired predetermined number of pieces of the second information and erases the predetermined number of pieces of the second information unnecessary from the memory.

6. A non-transitory computer-readable medium having stored thereon, a set of computer-executable instructions having at least one code section, the at least one code section being executable by one or more processors for causing a computer to perform steps comprising program:

acquiring and storing in a memory a digital signature including:
a first information generated based on a pair of multi-order multivariate polynomials $F=(f_1, \ldots, f_m)$ defined in a ring K and a signature key s which is an element of a set $K^n$, and
a plurality of pieces of a second information for verifying that the first information is generated using the signature key s based on data M to which the digital signature is attached, the pair of multi-order multivariate polynomials F, and vectors $y=(f_1(s), \ldots, f_m(s))$; and verifying legitimacy of the data M by confirming whether or not the first information is restorable using the plurality of pieces of the second information included in the digital signature, wherein the pair of multivariate polynomials F and the vectors y are public keys, wherein a predetermined number of pieces among the plurality of pieces of the second information are acquired and stored in the memory, wherein in a restoring process, the first information is restored sequentially using the acquired predetermined number of pieces of the second information and erases the predetermined number of pieces of the second information unnecessary from the memory wherein the first information is generated using a unidirectional function of processing information to be input by grouping the information to be input in units of blocks, and wherein the signature verification unit restores the first information by repeatedly executing a process of generating an intermediate value output by the unidirectional function in the process in the units of blocks based on the acquired predetermined number of pieces of the second information and a process of generating a subsequent intermediate value based on the generated intermediate value and the predetermined number of pieces of the subsequently acquired second information.

7. A non-transitory computer-readable recording medium having a set of instructions recorded thereon, the set of instructions causing a computer to perform steps comprising:

acquiring and storing in a memory a digital signature including:
a first information generated based on a pair of multi-order multivariate polynomials $F=(f_1, \ldots, f_m)$ defined in a ring K and a signature key s which is an element of a set $K^n$, and
a plurality of pieces of a second information for verifying that the first information is generated using the signature key s based on data M to which the digital signature is attached, the pair of multi-order multivariate polynomials F, and vectors $y=(f_1(s), \ldots, f_m(s))$; and verifying legitimacy of the data M by confirming whether or not the first information is restorable using the plurality of pieces of the second information included in the digital signature, wherein the pair of multivariate polynomials F and the vectors y are public keys, wherein a predetermined number of pieces among the plurality of pieces of the second information are acquired and stored in the memory, and wherein in a restoring process, the first information is restored sequentially using the acquired predetermined number of pieces of the second information and erases the predetermined number of pieces of the second information unnecessary from the memory.

* * * * *